(12) United States Patent
Kura

(10) Patent No.: US 8,449,055 B2
(45) Date of Patent: May 28, 2013

(54) INK CARTRIDGE AND RECORDING APPARATUS

(75) Inventor: Keiji Kura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 96 days.

(21) Appl. No.: 13/249,592

(22) Filed: Sep. 30, 2011

(65) Prior Publication Data

US 2012/0081422 A1 Apr. 5, 2012

(30) Foreign Application Priority Data

Sep. 30, 2010 (JP) .................................. 2010-221832

(51) Int. Cl.
*B41J 29/393* (2006.01)
*G01F 23/00* (2006.01)

(52) U.S. Cl.
CPC ..................................... *G01F 23/00* (2013.01)
USPC .................................... 347/7; 347/19; 347/86

(58) Field of Classification Search
CPC .......... G01F 23/246; G01F 23/22; G01F 23/00
USPC ........................................ 347/6, 7, 19, 84–87
See application file for complete search history.

(56) References Cited

U.S. PATENT DOCUMENTS

| | | | |
|---|---|---|---|
| 6,470,744 B1 | 10/2002 | Usui et al. | |
| 6,536,861 B1 | 3/2003 | Usui et al. | |
| 6,799,820 B1 | 10/2004 | Usui et al. | |
| 7,267,000 B1 | 9/2007 | Usui et al. | |
| 2002/0170353 A1 | 11/2002 | Usui et al. | |
| 2003/0043216 A1 | 3/2003 | Usui et al. | |
| 2003/0140694 A1 | 7/2003 | Usui et al. | |
| 2005/0068389 A1 | 3/2005 | Katayama et al. | |
| 2005/0162490 A1 | 7/2005 | Katayama et al. | |
| 2006/0001714 A1 | 1/2006 | Usui et al. | |
| 2006/0007283 A1 | 1/2006 | Sacco, Jr. et al. | |
| 2006/0033789 A1 | 2/2006 | Sasaki et al. | |
| 2006/0164482 A1 | 7/2006 | Katayama et al. | |
| 2006/0272404 A1 | 12/2006 | Usui et al. | |
| 2007/0091154 A1 | 4/2007 | Katayama et al. | |
| 2007/0126770 A1 | 6/2007 | Asauchi | |
| 2007/0277603 A1 | 12/2007 | Usui et al. | |
| 2007/0291088 A1 | 12/2007 | Katayama et al. | |

(Continued)

FOREIGN PATENT DOCUMENTS

| | | |
|---|---|---|
| EP | 1164022 A2 | 12/2001 |
| EP | 1792733 A1 | 6/2007 |

(Continued)

OTHER PUBLICATIONS

European Patent Office, extended European Search Report for European Patent Application No. 11183575.7.

(Continued)

*Primary Examiner* — Julian Huffman
(74) *Attorney, Agent, or Firm* — Baker Botts L.L.P.

(57) ABSTRACT

An ink cartridge includes: a casing; a pyroelectric portion; a heat conductor; and an electrical interface. The casing is configured to store ink therein. The casing has a bottom wall. The pyroelectric portion is configured to output an electrical signal. The heat conductor is configured to conduct heat to the ink and the pyroelectric portion. The heat conductor has at least a portion in contact with or disposed adjacent to the bottom wall. The electrical interface is configured to output an electrical signal outputted from the pyroelectric portion.

18 Claims, 14 Drawing Sheets

U.S. PATENT DOCUMENTS

| | | |
|---|---|---|
| 2008/0180457 A1 | 7/2008 | Yamazaki |
| 2009/0021566 A1 | 1/2009 | Usui et al. |
| 2009/0085942 A1 | 4/2009 | Asauchi |
| 2010/0007702 A1 | 1/2010 | Kosugi |

FOREIGN PATENT DOCUMENTS

| | | |
|---|---|---|
| EP | 1800872 A1 | 6/2007 |
| JP | H06-262771 A | 9/1994 |
| JP | H10-305590 A | 11/1998 |
| JP | 2001-146028 A | 5/2001 |
| JP | 2002-071456 A | 3/2002 |
| JP | 2005-043381 A | 2/2005 |
| JP | 2005-125738 A | 5/2005 |
| JP | 2006-082485 A | 3/2006 |
| JP | 2008-186095 A | 8/2008 |

OTHER PUBLICATIONS

International Searching Authority, International Search Report and Written Opinion for International Application No. PCT/JP2011/005541.

European Patent Office, extended European Search Report for European Patent Application No. 11183579.9.

European Patent Office, extended European Search Report for European Patent Application No. 11183565.8.

Japan Patent Office, Office Action for Japanese Patent Application No. 2007-135295, mailed Aug. 9, 2011.

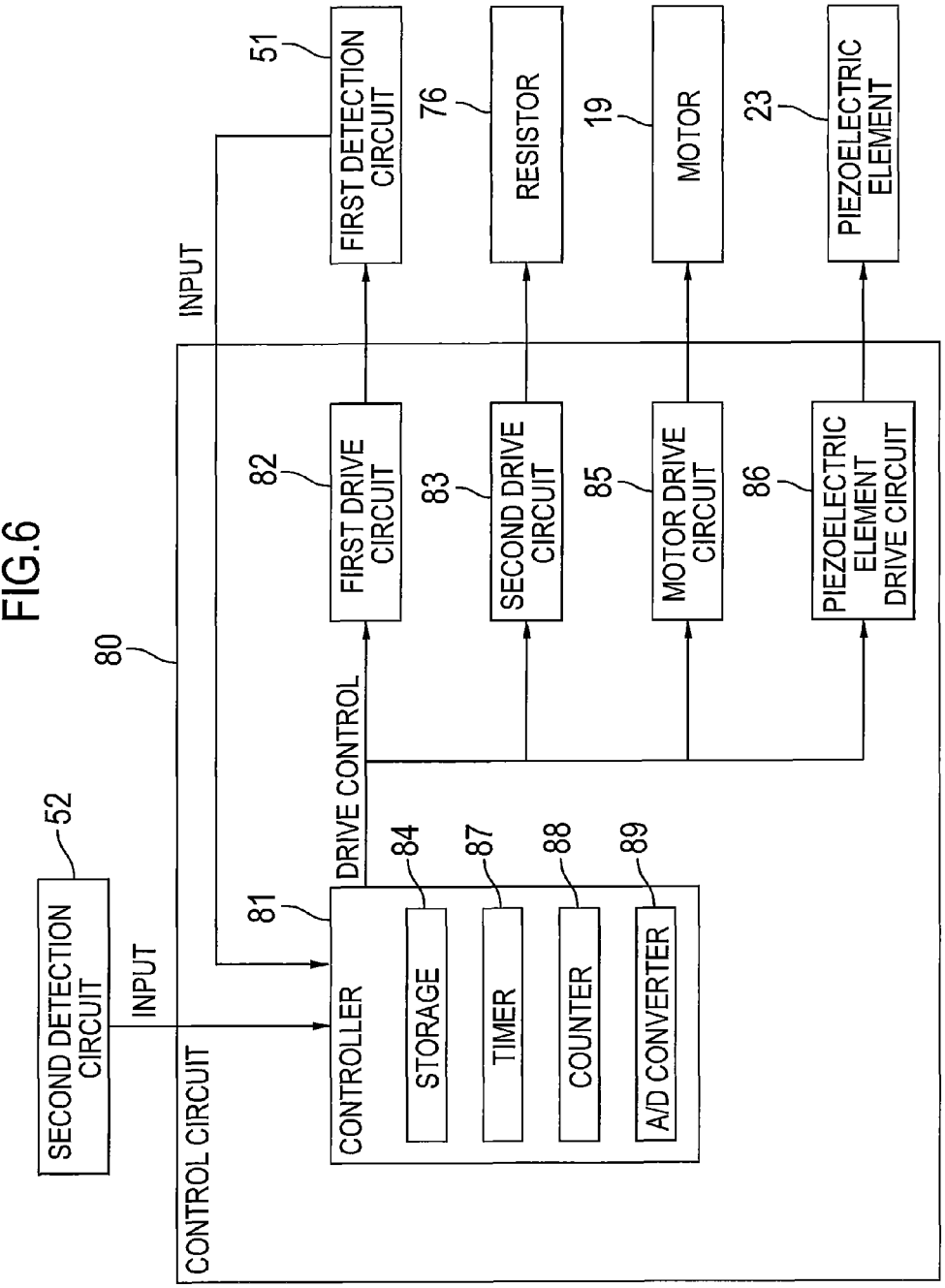

| FIRST DETERMINATION TABLE | V1_OUT |
|---|---|
| (i) ⎍⎍ | (i) ⎍⎍ |
| (ii) ⎍⎍⎍ | (ii) ⎍⎍ |
| (iii) ⎍⎍⎍⎍ | (iii) ⎍⎍⎍⎍ |
| (iv) ⎍⎍⎍⎍⎍⎍ | (iv) ⎍⎍⎍⎍⎍⎍ |

| (i) | BLACK |
|---|---|
| (ii) | YELLOW |
| (iii) | CYAN |
| (iv) | MAGENTA |

INK CARTRIDGE AND RECORDING
APPARATUS

CROSS REFERENCE TO RELATED
APPLICATION

This application claims priority from Japanese Patent Application No. 2010-221832 filed Sep. 30, 2010. The entire content of the priority application is incorporated herein by reference.

TECHNICAL FIELD

The present invention relates to an ink cartridge and a recording apparatus provided with a cartridge accommodating portion to accommodate the ink cartridge therein.

BACKGROUND

A well-known inkjet-type recording apparatus is configured to form (record) an image on a recording medium by ejecting ink thereon. Such recording apparatus is provided with a cartridge accommodating portion which an ink cartridge storing ink is insertable into and removable from.

To record an image on the recording medium, the ink-jet type recording apparatus ejects ink from a recording head while the ink is supplied to the recording head from the ink cartridge. When an amount of ink stored in the ink cartridge becomes empty, the inkjet-type recording apparatus is unable to record an image on the recording medium. In order to avoid such a situation, the inkjet-type recording apparatus is provided with a mechanism for detecting a remaining amount of ink stored in the ink cartridge. Further, the ink cartridge has a structure suitable for detection of the remaining amount of ink.

According to a conventional mechanism for detecting a remaining amount of ink in an ink cartridge, the ink cartridge used for an ink-jet recording apparatus has a transparent ink tank. Whether or not light exposing the ink tank is transmitted thereinto is determined by detecting whether or not the light is blocked by a shutter provided in the ink tank based on the remaining amount of ink in the ink tank. Further, according to another conventional mechanism, an amount of ink remaining in the ink cartridge is detected based on the number of ejections of ink from a recording head.

With the above-described mechanisms and structures of the inkjet-type recording apparatus and the ink cartridge, a user can recognize that the remaining amount of ink in the ink cartridge mounted in the inkjet-type recording apparatus has been decreasing. Hence, the user can replace the ink cartridge with a new one before the ink in the mounted ink cartridge becomes empty. Consequently, the user can avoid such a situation that no image can be recorded on a recording medium due to running out of the ink stored in the mounted ink cartridge.

SUMMARY

However, the above-described mechanisms and structures for detecting the remaining amount of ink are unable to detect the accurate amount of ink in the ink cartridge. For this reason, the ink cartridge needs to be replaced while a certain amount of ink still remains in the ink cartridge.

In view of the foregoing, it is an object of the present invention to provide a structure of an ink cartridge and a recording apparatus capable of accurately notifying a user of an ink fully-empty state in which no ink remains in an ink chamber of the ink cartridge or an ink near-empty state in which an amount of ink remaining in the ink chamber is so small that the ink is incapable of flowing out of the ink chamber.

In order to attain the above and other objects, the present invention provides an ink cartridge including: a casing; a pyroelectric portion; a heat conductor; and an electrical interface. The casing is configured to store ink therein. The casing has a bottom wall. The pyroelectric portion is configured to output an electrical signal. The heat conductor is configured to conduct heat to the ink and the pyroelectric portion. The heat conductor has at least a portion in contact with or disposed adjacent to the bottom wall. The electrical interface is configured to output an electrical signal outputted from the pyroelectric portion.

According to another aspect, the present invention provides a recording apparatus including: a cartridge accommodating section in which an ink cartridge of a predetermined type is detachably mountable; and a controller. The cartridge accommodating section is provided with a first electrical interface. The ink cartridge includes: a casing; a pyroelectric portion; a heat conductor; and a second electrical interface. The casing is configured to store ink therein. The casing has a bottom wall. The pyroelectric portion is configured to output an electrical signal. The heat conductor is configured to conduct heat to the ink and the pyroelectric portion. The heat conductor has at least a portion in contact with or disposed adjacent to the bottom wall. The second electrical interface is configured to be electrically connected to the first electrical interface when the ink cartridge is mounted in the cartridge accommodating section so as to output an electrical signal outputted from the pyroelectric portion to the first electrical interface. The controller is configured to detect at least one of the type of the mounted ink cartridge and the amount of ink in the casing based on the electrical signal outputted from the pyroelectric portion to the recording apparatus via the first electrical interface when ink cartridge is mounted in the cartridge accommodating section.

BRIEF DESCRIPTION OF THE DRAWINGS

The particular features and advantages of the present invention as well as other objects will become apparent from the following description taken in connection with the accompanying drawings, in which:

FIG. 6 is a block diagram showing an internal control system of the recording apparatus according to the embodiment;

DETAILED DESCRIPTION

Figure 1:
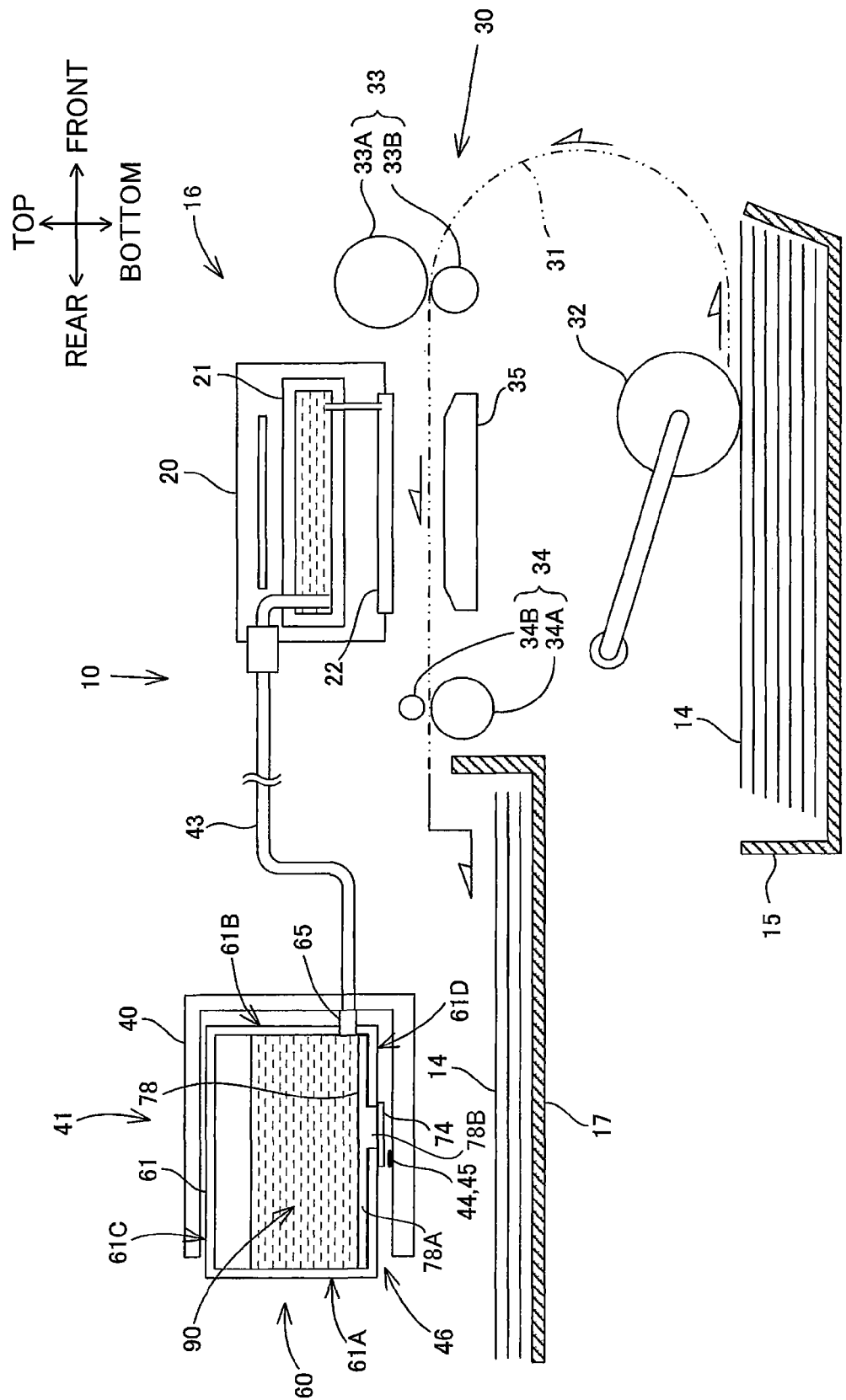
FIG. 1 is a schematic cross-sectional view of a recording apparatus according to one embodiment of the present invention, in which an ink cartridge according to the embodiment is accommodated in a cartridge accommodating section of the recording apparatus.

Next, an ink cartridge according to one embodiment of the present invention and a recording apparatus according to the embodiment in which the ink cartridge is detachably mountable will be described while referring to FIGS. 1 through 5 wherein like parts and components are designated by the same reference numerals to avoid duplicating description.

[General Structure of Recording Apparatus]

A general structure of the recording apparatus according to the embodiment will be described with reference to FIG. 1.

As shown in FIG. 1, the recording apparatus according to the embodiment is an inkjet-type recording apparatus 10. The terms "upward", "downward", "upper", "lower", "above", "below", "right", "left", "front", "rear" and the like will be used throughout the description assuming that the recording apparatus 10 is disposed in an orientation in which it is intended to be used. More specifically, in FIG. 1, a left side and a right side are a rear side and a front side, respectively. Directions related to an ink cartridge 60 (described later) that is mountable in the recording apparatus 10 will be referred to as if the ink cartridge 60 had been mounted in a cartridge accommodating section 40 (described later) of the recording apparatus, unless otherwise specified.

The recording apparatus 10 is a so-called multifunction device having a printer casing (not shown), a scanner casing (not shown) that is mounted on a top surface of the printer casing, and a document cover (not shown) that is mounted on a top surface of the scanner casing. Within the printer casing, a printing unit 16, a sheet supply tray 15, and a discharge tray 17 are provided, as shown in FIG. 1.

The recording apparatus 10 also includes a controller 81 (see FIG. 6) for controlling various operations of the recording apparatus 10. The controller 81 also serves to detect a type and a remaining amount of ink (i.e. an ink empty state) of the mounted ink cartridge 60, as will be described later. The term "type" as used herein is intended to mean what kind of ink is contained in the ink cartridge 60, for example. Accordingly, a cyan ink cartridge 60 and a black ink cartridge 60 are treated as different types of ink cartridges in the present embodiment. Instead, ink cartridges 60 storing ink of the same color but made of different chromatic materials may be treated as different types of ink cartridges. Further, the term "ink empty state" as used herein is intended to encompass both a fully-empty state with no ink remaining in an ink chamber 90 (described later) of the mounted ink cartridge 60 and a near-empty state in which an amount of ink remaining in the ink chamber 90 is so small that the ink is incapable of flowing out of the ink chamber 90 through an ink supply portion 65 (described later).

[Printing Unit]

The printing unit 16 functions to form an image on each recording medium 14 conveyed from the sheet supply tray 15. The image-formed recording medium is then discharged onto the discharge tray 17.

As shown in FIG. 1, the printing unit 16 includes a conveying section 30, a recording head 20, a cartridge accommodating section 40, a driving section (not shown), and a purging mechanism (not shown).

[Conveying Section]

The conveying section 30 is configured to convey recording mediums 14 accommodated in the sheet supply tray 15. The conveying section 30 includes a sheet feed roller 32, a conveying roller pair 33, a platen 35, and a discharge roller pair 34. While being in contact with the recording medium 14 stacked in the sheet supply tray 15, the sheet feed roller 32 is driven by the driving section to convey the recording medium 14 to a sheet conveying path 31. The conveying roller pair 33 and the discharge roller pair 34 are configured to convey the recording medium 14 conveyed by the sheet feed roller 32. The platen 35 is positioned between the conveying roller pair 33 and the discharge roller pair 34 in the sheet conveying path 31.

The conveying roller pair 33 is configured of a drive conveying roller 33A and a follower conveying roller 33B. The discharge roller pair 34 is configured of a drive discharge roller 34A and a follower discharge roller 34B. The drive conveying roller 33A and the drive discharge roller 34A are driven by the driving section, and the follower conveying roller 33B and the follower discharge roller 34B rotate following rotation of the drive conveying roller 33A and the drive discharge roller 34A, respectively. The recording medium 14 is conveyed over the platen 35 by at least one of the conveying roller pair 33 and the discharge roller pair 34.

[Recording Head]

The recording head 20 is configured to record an image on the recording medium 14. The recording head 20 is positioned above the platen 35. The recording head 20 includes a plurality of sub-tanks 21 (four in the present embodiment), a plurality of nozzles 22, and a plurality of piezoelectric elements 23 (FIG. 6).

Each sub-tank 21 serves to temporarily store ink supplied from corresponding ink cartridge 60 described later. The ink stored in each sub-tank 21 is then supplied to the plurality of nozzles 22.

Each nozzle 22 has an ink discharge outlet (not shown) facing toward the platen 35 positioned below. In response to print data, the piezoelectric elements 23 are selectively deformed such that the corresponding nozzles 22 can eject ink therefrom toward the recording medium 14 conveyed over the platen 35. In the present embodiment, the controller 81 controls whether to activate the piezoelectric elements 23 for ejecting the ink from the nozzles 22. The controller 81 may alternatively employ a heater to generate heat for producing bubbles in the ink such that the ink is ejected from the nozzles 22.

The recording head 20 is supported to a carriage (not shown). This carriage is movable along a guide rail (not shown) in a direction perpendicular to a conveying direction of the recording medium 14 (front-to-rear direction in FIG. 1) as well as to a heightwise direction of the recording apparatus 10 (upper-to-lower direction in FIG. 1). The carriage is driven by the driving section (not shown) to move in the direction. An image can be recorded on an entire surface of the recording medium 14 due to the movement of the recording head 20 against the recording medium 14 conveyed to the platen 35 by the conveying section 30.

[Driving Section]

The driving section (not shown) is configured to drive the recording head 20 and the conveying section 30. The drive section includes a plurality of motors 19 (FIG. 6) and a drive force transmission mechanism (not shown) for transmitting a drive force of the motors 19 to the conveying section 30 and the purging mechanism. The motors 19 are driven by a motor drive circuit 85 (FIG. 6) that is controlled by the controller 81 as will be described later.

[Controller]

The controller 81 is configured to control movements of the recording head 20 and the carriage. The controller 81 controls the recording medium 14 to intermittently move over the platen 35. While the recording medium 14 is stopped moving on the platen 35, the controller 81 controls the recording head 20 to eject ink droplets onto the recording medium 14 that is stationary on the platen 35 to record an image on the recording medium 14. The controller 81 controls the motors 19 of the driving section to rotate the discharge roller pair 34 in order to discharge the image-recorded recording medium 14 onto the discharge tray 17.

[Cartridge Accommodating Section]

The cartridge accommodating section 40 is configured to accommodate therein the ink cartridge 60. As shown in FIG. 1, the cartridge accommodating section 40 is provided in a box-shaped casing 41 formed with a rear opening 46. The casing 41 has three partitioning walls (not shown) protruding from inner surfaces thereof. That is, the three partitioning walls partition the interior of the casing 41 into four spaces. Each of the four spaces accommodates therein the ink cartridge 60. That is, the casing 41 has four cartridge accommodating sections 40. Each of the four cartridge accommodating sections 40 accommodates therein the ink cartridges 60 each storing ink of one of the colors cyan, magenta, yellow, and black. Further, the casing 41 is formed with a cover (not shown) for selectively opening and closing the opening 46. The cover is opened so that each ink cartridge 60 is mounted in or dismounted from the cartridge accommodating section 40 through the opening 46.

The cartridge accommodating section 40 includes an ink tube 43 for supplying ink stored in each ink cartridge 60 to the recording head 20. The cartridge accommodating section 40 further includes a pair of first electrical interfaces 44 and a pair of third electrical interfaces 45, for achieving electrical connection between each ink cartridge 60 and the cartridge accommodating section 40. The pair of first electrical interfaces 44 and the pair of third electrical interfaces 45 are respectively brought into contact with a pair of second electrical interfaces 75 (FIG. 3, described later) and a pair of fourth electrical interfaces 77 (FIG. 3, described later) when the ink cartridge 60 is mounted in the cartridge accommodating section 40.

[Ink Cartridge]

A detailed configuration of the ink cartridge 60 according to the embodiment will be described with reference to FIGS. 1, 2 and 3.

Figure 2:
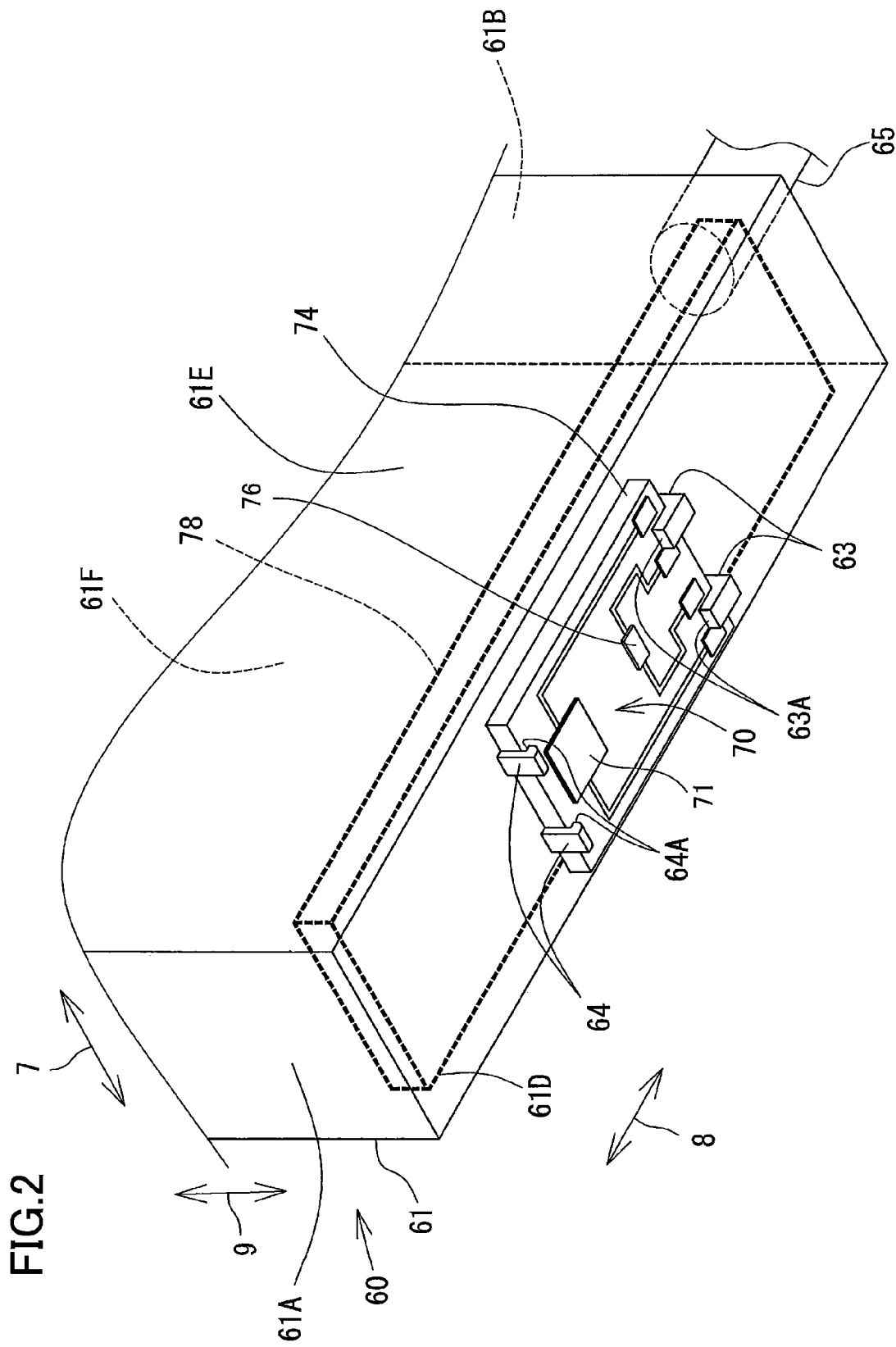
FIG. 2 is a partial schematic perspective view of the ink cartridge according to the embodiment, the ink cartridge including a sensor chip according to the embodiment, the sensor chip having a pyroelectric portion.

As shown in FIGS. 1 and 2, the ink cartridge 60 has a cartridge casing 61 defining therein the ink chamber 90 (FIG. 1) for storing ink, and a sensor chip 70 whose outputs are used for detecting the color (type) and the remaining amount of ink (ink empty state) of the ink cartridge 60.

[Cartridge Casing]

The cartridge casing 61 has a generally flat rectangular shape having a width (in a direction indicated by an arrow 7 in FIG. 2 which will be hereinafter referred to as widthwise direction), a height (in a direction indicated by an arrow 9 in FIG. 2 which will be hereinafter referred to as heightwise direction), and a depth (in a direction indicated by an arrow 8 in FIG. 2 which will be hereinafter referred to as depthwise direction), the width being smaller than the height and the depth.

In the present embodiment, the ink cartridge 60 is mounted in or dismounted from the cartridge accommodating section 40 of the recording apparatus 10 in a direction parallel to the depthwise direction 8 (the front-to-rear direction). The widthwise direction 7 corresponds to the horizontal direction (a left-to-right direction), and the vertical direction 9 corresponds to the gravitational direction (the upper-to-lower direction).

The cartridge casing 61 has a top wall 61C (FIG. 1), a bottom wall 61D, and side walls including a rear wall 61A, a front wall 61B, a right side wall 61E, and a left side wall 61F. When the ink cartridge 60 is mounted in the cartridge accommodating section 40, the front wall 61B and the rear wall 61A are located at a leading side and at a trailing side, respectively, in the mounting direction of the ink cartridge 60 in the cartridge accommodating section 40. In other words, the front wall 61B is located at a far side of the recording apparatus 10 in the mounting direction, and the rear wall 61A is located at a near side of the recording apparatus 10 in the mounting direction. The front wall 61B and the rear wall 61A are arranged in confrontation with and spaced apart from each other in the depthwise direction 8. The right side wall 61E and the left side wall 61F respectively extend in the depthwise direction 8 and are connected to the front wall 61B and the rear wall 61A. The top wall 61C bridges respective upper edges of the right side wall 61E, the left side wall 61F, the front wall 61B and the rear wall 61A, and extends in the depthwise direction 8 from the upper edge of the front wall 61B to the upper edge of the rear wall 61A. The bottom wall 61D bridges respective lower edges of the right side wall 61E, the left side wall 61F, the front wall 61B, and the rear wall 61A, and extends in the depthwise direction 8 from the lower edge of the front wall 61B to the lower edge of the rear wall 61A.

The top wall 61C, the bottom wall 61D, the rear wall 61A, the front wall 61B, the right side wall 61E, and the left side wall 61F of the cartridge casing 61 defines the ink chamber 90.

The cartridge casing 61 is formed, for example, by attaching a film to a frame.

When the cartridge casing 61 is mounted in the cartridge accommodating section 40, the ink tube 43 is connected to the ink supply portion 65 provided at the front wall 61B. The ink supply portion 65 has a hollow cylindrical configuration having one open end extending through the front wall 61B and another end portion protruding frontward in the mounting direction from the front wall 61B. The ink supply portion 65 is connected to the ink tube 43 when the ink cartridge 60 is mounted in the cartridge accommodating section 40. More specifically, the ink supply portion 65 is disposed at the front wall 61B and located at a position closer to the bottom wall 61D than to the top wall 61C with respect to the heightwise direction 9. In other words, the ink supply portion 65 is positioned at a lower portion of the front wall 61B. When the ink cartridge 60 is mounted in the cartridge accommodating section 40, ink stored in the ink chamber 90 flows into the sub tank 21 of the same color through the ink supply portion 65 and the ink tube 43. That is, the ink supply portion 65 is configured to allow ink to flow out of the ink chamber 90.

Figure 3:
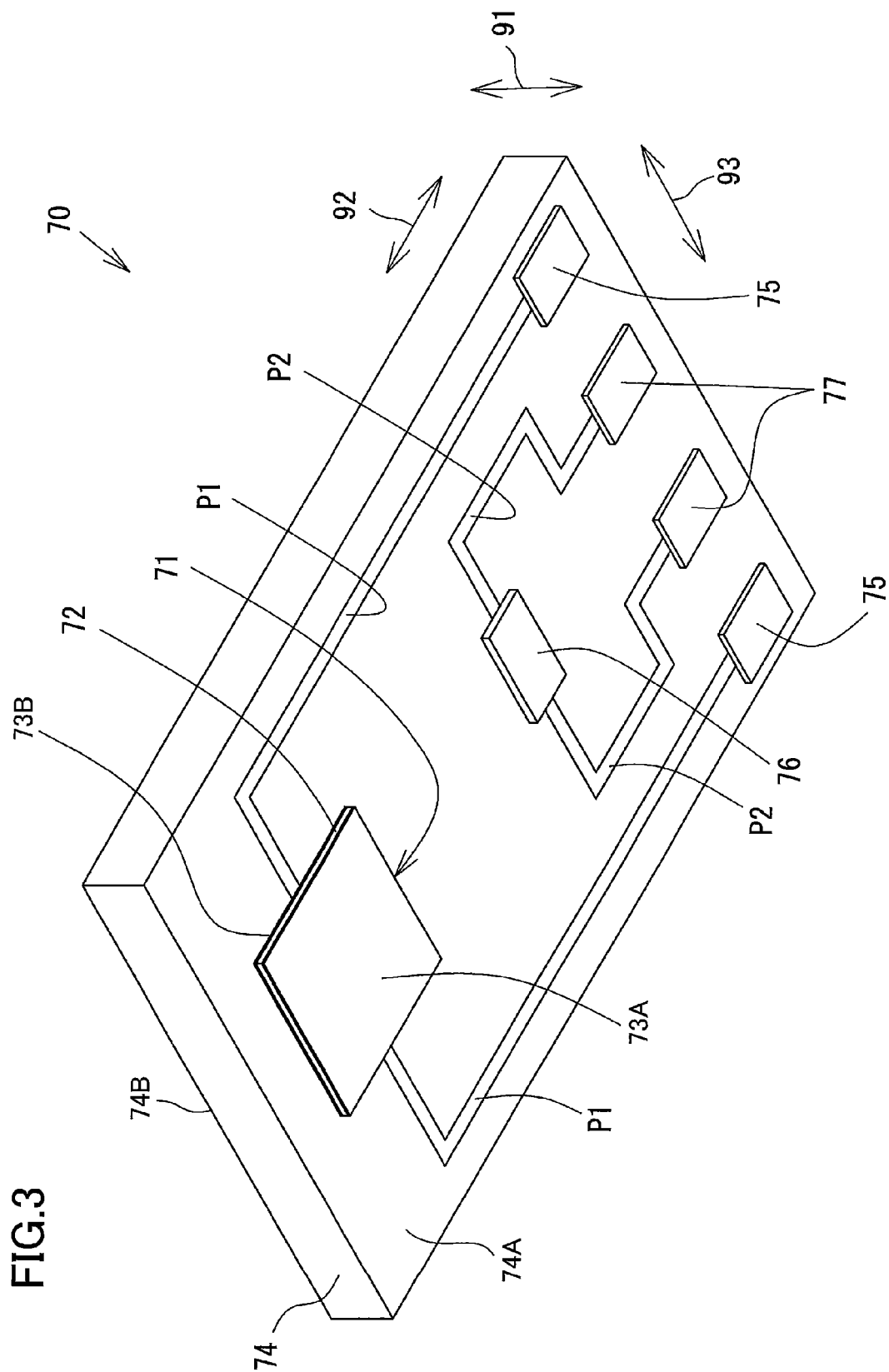
FIG. 3 is a schematic perspective view of the sensor chip according to the embodiment.

On the bottom wall 61D of the cartridge casing 61, a pair of positioning claws 63 and a pair of engaging claws 64 are provided for holding the sensor board 74 (FIG. 3). The pair of positioning claws 63 are disposed in separation from each other in the widthwise direction 7. The pair of engaging claws 64 is disposed such that the engaging claws 64 are in separation from each other in the widthwise direction 7 and spaced apart from the positioning claws 63 in the depthwise direction 8. Each positioning claw 63 has a base portion and a claw portion 63A protruding from the base portion toward the confronting engaging claw 64. Likewise, each engaging claw 64 has a base portion and a claw portion 64A protruding from the base portion toward the confronting positioning claw 63. The engaging claw 64 is formed of a synthetic resin material and has a resiliency. For fixing the sensor board 74 to the bottom wall 61D of the cartridge casing 61, the engaging claws 64 resiliently deform such that the sensor board 74 can be fitted in a space formed between the pair of positioning claws 63 and the pair of engaging claws 64. Note that the sensor board 74 may be fixed to the bottom wall 61D of the cartridge casing 61 by welding, or by an adhesive agent.

[Sensor Chip]

As shown in FIG. 2, the sensor chip 70 includes the sensor board 74 and a heat conductor 78.

[Sensor Board]

As shown in FIG. 3, the sensor board 74 includes a pyroelectric portion 71, a resistor 76 (thermoelectronic element), the pair of second electrical interfaces 75, the pair of fourth electrical interfaces 77, a first circuit pattern P1, and a second circuit pattern P2.

The sensor board 74 is made of an electrically insulative material such as glass epoxy and ceramics. The sensor board 74 is formed in a rectangular plate shape, having a pair of surfaces 74A, 74B confronting each other in the heightwise direction 9, that is, in a thickness direction 91 of the sensor board 74. Note that, in the present embodiment, the thickness direction 91 is coincident with the heightwise direction 9. The sensor board 74 is held to a lower surface (outer surface) of the bottom wall 61D of the cartridge casing 61 by being engaged between the pair of positioning claws 63 and the pair of engaging claws 64. At this time, the surface 74B is in direct contact with the bottom wall 61D (the lower surface of the bottom wall 61D), and longitudinal ends of the surface 74B are parallel to the depthwise direction 8. Hereinafter, a direction in which the longitudinal ends of the surface 74B extend will be referred to as a longitudinal direction 92. In the present embodiment, the longitudinal direction 92 is coincident with the depthwise direction 8. Further, one of the surfaces 74B that is in direct confrontation with the bottom wall 61D of the cartridge casing 61 will be referred to as a contact surface 74B, whereas remaining one of the surfaces 74A on which the pyroelectric portion 71 is mounted will be referred to as a mounting surface 74A.

[Resistor]

As shown in FIG. 3, the resistor 76 is positioned at a substantially centre portion of the mounting surface 74A of the sensor board 74 for generating heat. As the resistor 76, a plate-shaped resistor is used in order to enhance heat conduction to the sensor board 74. The resistor 76 has both widthwise ends in a lateral direction 93 which is coincident with the widthwise direction 7. Each widthwise end is connected to either one of the fourth electrical interfaces 77 via the second circuit pattern P2. Instead of the resistor 76 of the present embodiment, a material capable of generating heat when powered, or an infrared ray-emitting diode may be used.

[Pyroelectric Section]

The pyroelectric portion 71 is disposed on the mounting surface 74A of the sensor substrate 74. That is, the pyroelectric portion 71 is disposed on the lower surface (outer surface) of the bottom wall 61D. As shown in FIG. 3, the pyroelectric section 71 has a three-layered structure, including a pyroelectric element 72 (dielectric material) and a pair of film electrodes 73 (73A, 73B) interposing the pyroelectric element 72 therebetween in the thickness direction 91. The pyroelectric portion 71 has a prescribed electrostatic capacitance. The sensor board 74 and the heat conductor 78 (described later) constitutes a heat conductor, and forms a heat conduction path between the pyroelectric portion 71 and the ink stored in the ink chamber 90 for conducting heat generated at the resistor 76 to the pyroelectric portion 71 and to the ink.

The pyroelectric portion 71 is held to the sensor board 74 (the mounting surface 74A) by an insulating thin film, for example, an organic insulation film such as polyimide resin film, or an inorganic insulation film such as $SiO_2$ thin film and $Si_3N_4$ thin film.

The pyroelectric element 72 is formed in a rectangular film-like shape and formed of lead zirconate titanate, for example. The pyroelectric element 72 exhibits a pyroelectric effect according to which a change in temperature causes intrinsic polarisation. As the pyroelectric element 72, the following pyroelectric materials are available other than lead zirconate titanate: inorganic materials such as lithium titanate, other lead titanate, tourmaline (cyclo-silicate mineral including boron) and lithium tantalate, or organic materials such as triglycine sulfate (TGS) and polyvinylidene fluoride (PVDF).

Each of the film electrodes 73A, 73B is formed in a rectangular shape, and is vapor-deposited (evaporated) to the pyroelectric element 72. The film electrode 73B is in direct contact with the mounting surface 74A of the sensor board 74, whereas the film electrode 73A constitutes a bottom surface of the pyroelectric portion 71.

The pair of film electrodes 73A, 73B is connected to the pair of the second electrical interfaces 75 via the first circuit pattern P1, respectively.

The pyroelectric portion 71 is disposed at the mounting surface 74A of the sensor board 74 at a position closer to the pair of engaging claws 64 than to the pair of the positioning claws 63 with respect to the depthwise direction 8. That is, the pyroelectric portion 71 is disposed at a rear portion of the mounting surface 74A. Each film electrodes 73A, 73B of the pyroelectric portion 71 is connected to the first circuit pattern P1 provided at the sensor board 74 by means of wire bonding, for example.

Incidentally, the film electrodes 73A, 73B are not necessarily vapor-deposited (evaporated) to the pyroelectric element 72. Instead, each of the film electrodes 73A, 73B may be integrally formed with the first circuit pattern P1 and attached to the pyroelectric element 72 by an electrically-conductive adhesive agent or by means of wire bonding.

Figure 4:
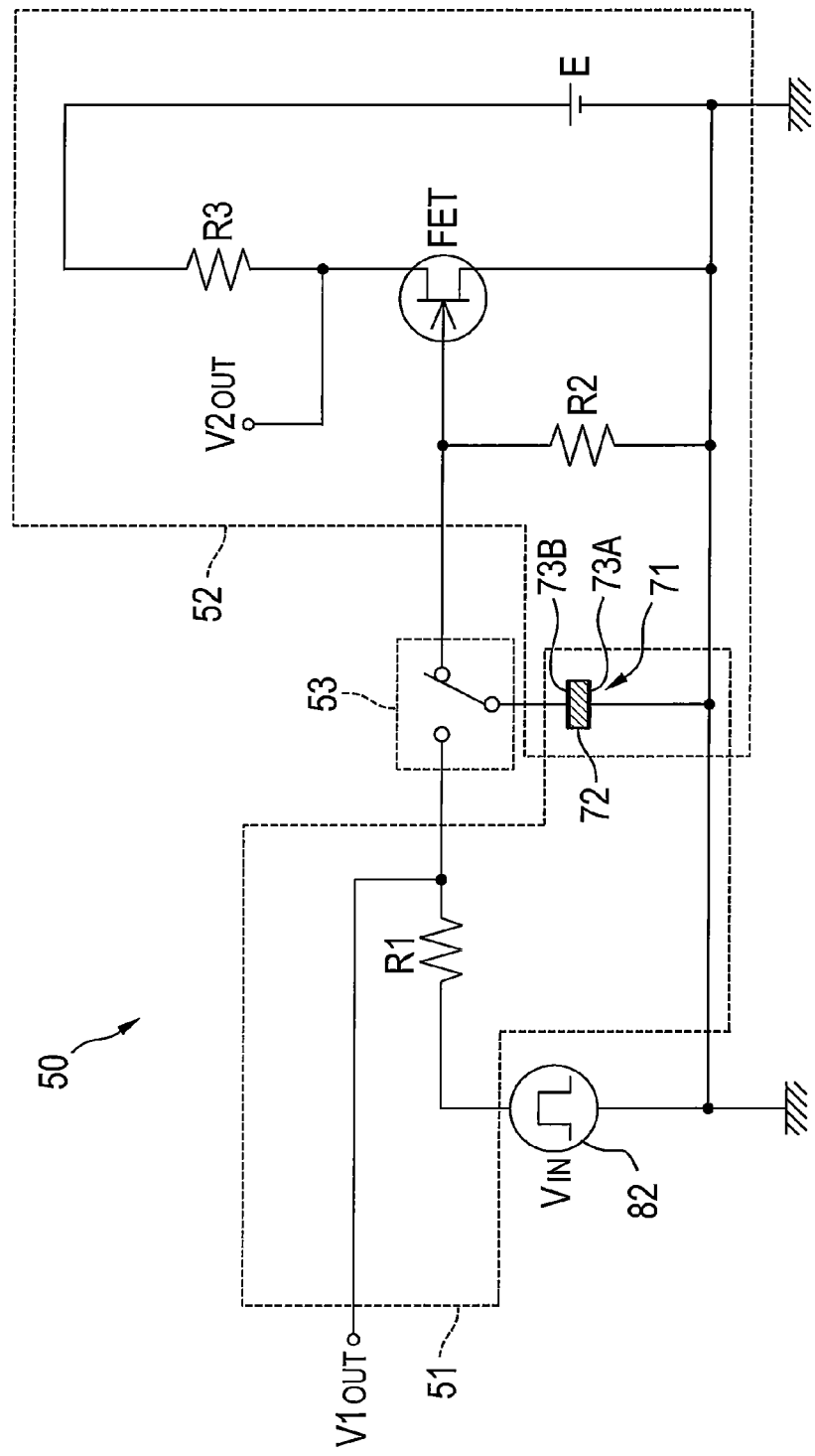
FIG. 4 is an electric circuit diagram of a detection scheme configured when the ink cartridge of the embodiment is mounted in the recording apparatus according to the embodiment, in which the electrical circuit is configured of a first detection circuit (RC circuit) and a second detection circuit (amplifier circuit)
Figure 5:
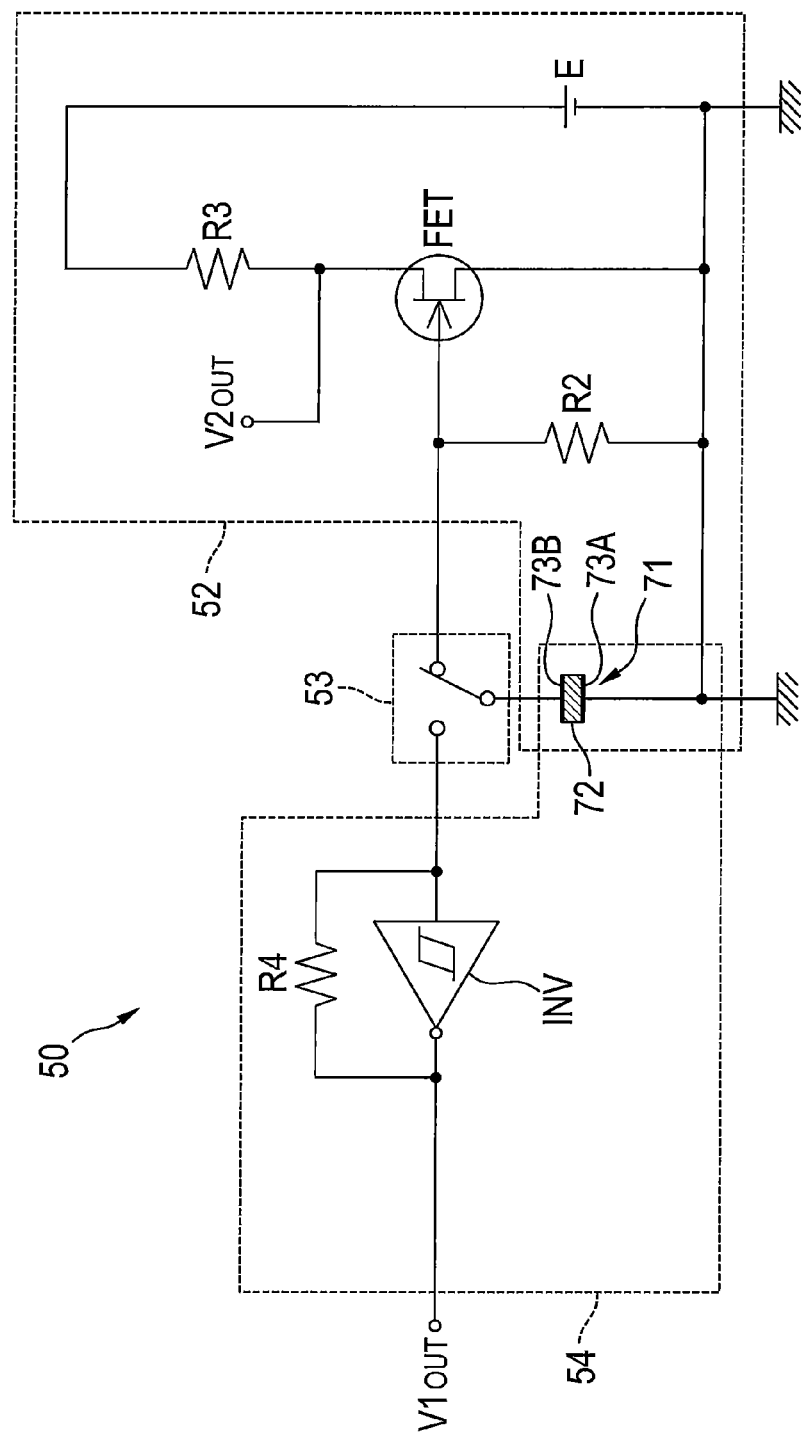
FIG. 5 is another electric circuit diagram of the detection scheme configured when the ink cartridge of the embodiment is mounted in the recording apparatus according to the embodiment, in which the electrical circuit is configured of a first detection circuit (oscillation circuit) and the second detection circuit (amplifier circuit)

The film electrode 73A is virtually grounded, as shown in FIGS. 4 and 5.

The electrostatic capacitance of the pyroelectric portion 71 can vary depending on an electric permittivity of the pyroelectric element 72, a distance between the film electrodes 73A, 73B (a thickness of the pyroelectric element 72), and an surface area of the film electrodes 73A, 73B as viewed from the thickness direction 91. In other words, the electrostatic capacitance of the pyroelectric portion 71 can be changed by changing the material constituting the pyroelectric portion 71, or, instead of changing the material, by changing the thickness of the pyroelectric element 72 or the surface area of the film electrodes 73A, 73B. In the present embodiment, each ink cartridge 60 is designed to have the pyroelectric portion 71 whose electrostatic capacitance is different from one another, depending on colors of ink or types of chromatic materials of ink stored in the ink cartridge 60. That is, the electrostatic capacitance of each pyroelectric portion 71 can be set to a particular value that is unique (peculiar) to each ink cartridge 60.

[Second Electrical Interface]

As shown in FIG. 3, the pair of second electrical interfaces 75 is disposed at the mounting surface 74A of the sensor board 74, each aligned in the lateral direction 93 and provided at a position closer to the positioning claws 63 than to the engaging claws 64 in the longitudinal direction 92 but offset from each positioning claw 63 (FIG. 2) in the lateral direction 93. In other words, the pair of second electrical interfaces 75 is disposed below and adjacent to the bottom wall 61D of the cartridge casing 61. Each of the second electrical interfaces 75 is connected to either one of the film electrodes 73A, 73B of the pyroelectric portion 71 via the first circuit pattern P1 of the sensor board 74. The first circuit pattern P1 is arranged on the mounting surface 74A such that the first circuit pattern P1 has a portion extending in the longitudinal direction 92. When the ink cartridge 60 is mounted in the cartridge accommodating section 40, the second electrical interfaces 75 are respectively brought into abutment with the first electrical interfaces 44 provided on the cartridge accommodating section 40.

[Fourth Electrical Interface]

As shown in FIG. 3, the pair of fourth electrical interfaces 77 is disposed between the second electrical interfaces 75 aligned in the lateral direction 93, each also aligned in the lateral direction 93 and provided at a position offset from each positioning claw 63. In other words, the pair of fourth electrical interfaces 77 is disposed below and adjacent to the bottom wall 61D of the cartridge casing 61. Each fourth electrical interface 77 is connected to either one of the widthwise ends of the resistor 76 via the second circuit pattern P2. The second circuit pattern P2 is arranged on the mounting surface 74A such that the second circuit pattern P2 has a portion extending along the first circuit pattern P1. When the ink cartridge 60 is mounted in the cartridge accommodating section 40, the fourth electrical interfaces 77 are respectively brought into abutment with the third electrical interfaces 45 provided on the cartridge accommodating section 40.

[Heat Conductor]

The heat conductor 78 is adapted to conduct heat applied from the resistor 76 to the ink stored in the ink chamber 90. As shown in FIGS. 1 and 2, the heat conductor 78 is disposed at a bottom portion of the cartridge casing 61 and adjacent to the ink supply portion 65. The heat conductor 78 is formed in a generally plate shape having a base portion 78A and a penetrating portion 78B penetrating the bottom wall 61D of the cartridge casing 61. Whereas the base portion 78A is disposed in the ink chamber 90, the penetrating portion 78B penetrates the bottom wall 61D so as to be in contact with the sensor board 74 at a position between the resistor 76 and the pyroelectric portion 71 (the pyroelectric element 72). Alternatively, the penetrating portion 78B may be disposed to be adjacent to the sensor board 74. With this configuration, the heat conductor 78 forms a heat conduction path between the sensor board 74 and the ink stored in the ink chamber 90 to conduct heat applied from the resistor 76 to the ink stored in the ink chamber 90.

The base portion 78A has a lower surface that is in direct confrontation with an upper surface (inner surface) of the bottom wall 61D. The base portion 78A entirely covers the upper surface of the bottom wall 61D. The lower surface of the base portion 78A is in facial contact with the upper surface of the bottom wall 61D defining the bottom of the ink chamber 90. Because the base portion 78A is positioned at the bottom of the ink chamber 90, an upper surface of the base portion 78A is immersed in or in contact with the ink stored in the ink chamber 90 when there is ink in the ink chamber 90. The heat conductor 78 has at least a portion in contact with the bottom wall 61D. The heat conductor 78 may have at least a portion disposed adjacent to the bottom wall 61D.

The penetrating portion 78B is provided at a position opposite the ink chamber 90 relative to the base portion 78A, and penetrates the bottom wall 61D. This configuration allows the penetrating portion 78B to position close to the pyroelectric portion 71 which is disposed below the bottom wall 61D, that is, disposed below the bottom of the ink chamber 90. The penetrating portion 78B is thus disposed close to the pyroelectric element 72 constituting a part of the pyroelectric portion 71.

With the above-described configuration, the heat conductor 78 is immersed in (in contact with) the ink in the ink chamber 90 even when there is very little ink left in the ink chamber 90, while the heat conductor 78 is exposed to the atmosphere (i.e. not in contact with ink) in the ink chamber 90 when there is no ink left in the ink chamber 90.

The heat conductor 78 is fabricated by a material having a relatively high thermal conductivity, such as copper foil and aluminum foil.

The heat conductor 78 serves to conduct a heat applied from the resistor 76 via the sensor board 74 to the ink stored in the ink chamber 90 defined in the cartridge casing 61.

More precisely, the heat applied from the resistor 76 is conducted to both of the heat conductor 78 and the pyroelectric portion 71 via the sensor board 74. When there is a sufficient amount of ink remaining in the ink chamber 90, the heat conducted to the heat conductor 78 is conducted to the ink since the heat conductor 78 is immersed in the ink. At the same time, the pyroelectric portion 71 is also applied with heat via the sensor board 74, but the temperature of the pyroelectric portion 71 is substantially remains unchanged since the sufficient amount of ink can absorb the heat conducted to the pyroelectric portion 71 in addition to the heat directly conducted from the heat conductor 78. The pyroelectric portion 71 therefore exhibits little change in temperature.

In other words, when the amount of ink is sufficient, the heat generated at the resistor 76 can be ultimately released to the ink, thereby suppressing heat from being conducted to the pyroelectric portion 71. At this time, the amount of heat conducted to the pyroelectric portion 71 when a current flows into the resistor 76 is smaller than that conducted to the ink, since the amount of heat conducted to the ink is a combination of the amount of heat conducted directly from the heat conductor 78 and the amount of heat conducted from the pyroelectric portion 71 via the sensor board 74 and the heat conductor 78. Since little amount of heat is applied, the pyroelectric portion 71 has preserved little amount of heat to develop a voltage between the film electrodes 73A, 73B.

However, when the amount of ink remaining in the ink chamber 90 is reduced to such a level that the heat conductor 78 is not immersed in the ink, heat can no longer be conducted to the ink from the heat conductor 78. As a result, the heat conducted to the heat conductor 78, which had been conducted to the ink while the heat conductor 78 was in contact with the ink, is conducted to the pyroelectric portion 71 via the sensor board 74. Likewise, the heat conducted to the pyroelectric portion 71 can no longer be conducted to the ink, either. Therefore, the temperature of the pyroelectric portion 71 starts to rise due to the heat conducted from the resistor 76 via the sensor board 74 and the heat conducted from the heat conductor 78 via the sensor board 74.

In other words, the greater amount of heat is conducted to the pyroelectric portion 71 than to the heat conductor 78 not immersed in the ink, causing the temperature of the pyroelectric portion 71 to increase significantly. As a result, due to the pyroelectric effect, a voltage is developed between the pair of film electrodes 73A, 73B. The voltage is then outputted to the controller 81 for detecting the ink empty state of the ink cartridge 60.

In this way, since the heat conductor 78 is disposed at the bottom of the ink chamber 90, the recording apparatus 10 can detect whether or not the amount of ink remaining in the ink chamber 90 is in the ink empty state by detecting the output voltage from the pyroelectric portion 71, as will be described later in detail.

[Detection Scheme]

An electrical connection between the ink cartridge 60 mounted in the cartridge accommodating section 40 and the recording apparatus 10 (serving as a detection scheme 50) will be described while referring to FIGS. 4 and 5.

The detection scheme 50 is configured of a first detection circuit 51, a second detection circuit 52, and a toggle switch 53.

[Switch]

The toggle switch 53 is illustrated to include a first-detection side fixed contact, a second-detection side fixed contact, and a wiper contact that can trip between the two fixed contacts. The first detection circuit 51 or the second detection circuit 52, whichever is selected by the switch 53, is connected to the pyroelectric portion 71. The switch 53 is operated in accordance with signals from the controller 81. An electromagnetic switch or a semiconductor switch is available as the switch 53.

[First Detection Circuit]

The first detection circuit 51 is provided for detecting the electrostatic capacitance of the pyroelectric portion 71 to thereby identify the type (color) of the ink cartridge. It should be noted that the pyroelectric portion 71 is electrically equivalent to a capacitor. In the description of the circuits shown in FIGS. 4 and 5, the pyroelectric portion 71 may be referred to as a capacitor 71 where necessary.

The first detection circuit 51 is closed when the wiper contact of the switch 53 is toggled to the first-detection side contact. The first detection circuit 51 is configured of the capacitor 71, and a resistor R1 having one terminal connected to the non-grounded side electrode 73B of the capacitor 71 and another terminal connected to a first drive circuit 82. As will be described later with reference to FIG. 6, the first drive circuit 82 is a part of a control circuit 80 and outputs, under the aegis of the controller 81, a pulse signal having a voltage level $V_{IN}$ with a predetermined duration. A totem-pole output circuit well known in the art can be used for the first drive circuit 82. An output from the first detection circuit 51 is derived from an output terminal $V1_{OUT}$ connected to a node between the resistor R1 and the non-grounded side electrode 73B of the capacitor 71.

The first detection circuit 51 forms an RC circuit in which the capacitor 71 is gradually charged in response to the pulse signal applied from the first drive circuit 82. The voltage developed across the capacitor 71 is detected at a relevant time t1 before the capacitor is fully charged and the resultant voltage is outputted to an A/D converter 89 (described later) of the controller 81 through the output terminal $V1_{OUT}$. In the transition period before the capacitor 71 is fully charged, the voltage across the capacitor 71 differs depending upon the electrostatic capacitance. The voltage across the capacitor 71 and the electrostatic capacitance thereof are in an exponential curve relation. More specifically, the smaller the electrostatic capacitance is, the higher the voltage is developed across the capacitor. Among capacitors different in electrostatic capacitance, the capacitor with the smallest electrostatic capacitance C1 develops the highest voltage thereacross and the capacitor with the second smallest electrostatic capacitance C2 develops the second highest voltage thereacross at time t1 as shown in FIG. 7B. The difference ΔV between the highest and the second highest voltages enables the two types of capacitors different in electrostatic capacitance to distinguish. The above-described voltage-and-electrostatic capacitance relation is true with respect to the remaining two capacitors having electrostatic capacitances C3 and C4 shown in FIG. 7B. Thus, the type (color) of the ink cartridge 60 can be identified by the voltage detected at time t1.

FIG. 5 shows another example of the first detection circuit. In this example, an oscillation circuit is used in the first detection circuit and is referred to either as a first detection circuit 54 or an oscillation circuit 54. The configuration of the second detection circuit 52 is the same as that shown in FIG. 4. The first detection circuit 54 shown in FIG. 5 includes the capacitor 71, a resistor R4 and an inverter (INV). The resistor R4 and the inverter are connected in parallel and this parallel-connection circuit is connected to the non-grounded side electrode 73B of the capacitor 71. The output of the inverter is used as the output of the first detection circuit 54. The oscillation circuit (the first detection circuit 54) generates pulse trains having a frequency determined depending upon the electrostatic capacitance of the capacitor 71. Therefore, the frequency of the pulse trains can identifies the color or type of the cartridge 60.

The inverter has two threshold values $V_{T+}$ and $V_{T-}$ where $V_{T+}$ is greater than $V_{T-}$. Before turning on a power source (not shown) of the oscillation circuit 54, no electric charges are accumulated in the capacitor 71, so that the voltage across the capacitor 71 is zero. In this case, the input to the inverter is treated as being at a low level and thus the output of the inverter is at a high level. When the capacitor 71 is gradually charged and the voltage across the capacitor 71 has reached the upper threshold value $V_{T+}$, then the input to the inverter is treated as being changed from the low level to the high level, causing the output of the inverter to change from the high level to a low level. The electric charges accumulated in the capacitor 71 are then discharged through the resistor R4 and the voltage across the capacitor 71 is gradually lowered. When the voltage across the capacitor 71 has lowered to the lower threshold value $V_{T-}$, the input to the inverter is treated as being changed from the high level to the low level, causing the inverter output to change from the low level to the high level. In this way, pulse trains are outputted from the output terminal $V1_{OUT}$ of the first detection circuit 54 to the A/D converter 89. The frequency of the pulse trains outputted therefrom changes depending upon the electrostatic capacitance of the capacitor 71. Accordingly, the ink cartridges having their own electrostatic capacitance can be identified from the frequency of the oscillated pulse trains.

[Second Detection Circuit]

The second detection circuit 52 is provided for detecting the voltage developed across the capacitor 71 to thereby indicate the remaining amount of ink in the ink cartridge 60.

The second detection circuit 52 is closed when the wiper contact of the switch 53 is toggled to the second-detection side contact. The second detection circuit 52 is configured of a DC power source E, resistors R2, R3, and a field-effect transistor (FET), as shown in FIGS. 4 and 5.

The second detection circuit 52 serves as an amplifier circuit. More specifically, the FET has a gate to which a voltage developed across the resistor R2 is applied, a drain connected to one terminal of the resistor R3, and a source connected to the negative terminal of the DC power source E. The resistor R3 is connected between the positive terminal of the DC power source E and the drain of the FET. An output terminal $V2_{OUT}$ is derived from a node connecting the resistor R3 and the drain of the FET. In operation, when a voltage is applied to the gate of the FET, the latter is rendered conductive and its ON resistance changes depending upon the gate voltage. The voltage derived from the output terminal $V2_{OUT}$ is amplified with respect to the gate voltage equal to the voltage developed across the capacitor 71.

In this way, the output voltage generated at the pyroelectric portion 71 due to heat conducted from the resistor 76 is amplified by the amplifier circuit and then outputted to the controller 81 for detection of the remaining amount of ink in the ink cartridge 60.

[Control Circuit]

Next, an internal control system of the recording apparatus 10 will be described with reference to FIG. 6.

The recording apparatus 10 includes a control circuit 80 which controls power supply to the first detection circuit 51, the resistor 76, the motors 19, and the piezoelectric elements 23.

As shown in FIG. 6, the control circuit 80 includes the controller 81, the motor drive circuit 85 for driving the motors 19, a piezoelectric element drive circuit 86 for driving the piezoelectric elements 23, the first drive circuit 82 for driving the first detection circuit 51, and a second drive circuit 83 for supplying power to the resistor 76. The controller 81 controls whether to drive the first drive circuit 82, the second drive circuit 83, the motor drive circuit 85, and the piezoelectric element drive circuit 86.

[Controller]

As shown in FIG. 6, the controller 81 includes a storage 84, a timer 87, a counter 88, and the A/D converter 89. The storage 84 stores therein a first determination table and a second determination table. The first determination table contains predetermined values (hereinafter referred to as first values) for determining the type of the ink cartridge 60 mounted in the cartridge accommodating section 40. The second determination table contains a prescribed value (hereinafter referred to as a second value) as a threshold value for determining whether the amount of ink remaining in each ink cartridge 60 is in the ink empty state.

The timer 87 and the counter 88 will be necessary when the recording apparatus 10 performs detection of the type of the ink cartridge 60 mounted therein and detection of the ink empty state of the ink cartridge 60, as will be described below. The A/D converter 89 serves to convert analog signals outputted from the first detection circuit 51 into digital signals.

[Operations of Recording Apparatus Controlled by Controller]

How the recording apparatus 10 will determine the type (color) of the ink cartridge 60 mounted therein will first be described. In the present embodiment, the detection of the electrostatic capacitance of the pyroelectric portion 71 is performed using the first detection circuit 51 shown in FIG. 4. However, as described earlier, the electrostatic capacitance of the pyroelectric portion 71 can also be detected by using the oscillation circuit 54 shown in FIG. 5. Hereinafter, therefore, a process for detecting the electrostatic capacitance of the pyroelectric portion 71 using the first detection circuit 51 of FIG. 4 will first be described with reference to FIGS. 7A and 7B. Then, another process for detecting the electrostatic capacitance of the pyroelectric portion 71 using the oscillation circuit 54 of FIG. 5 will be described with reference to FIGS. 8A and 8B.

Figure 7A:
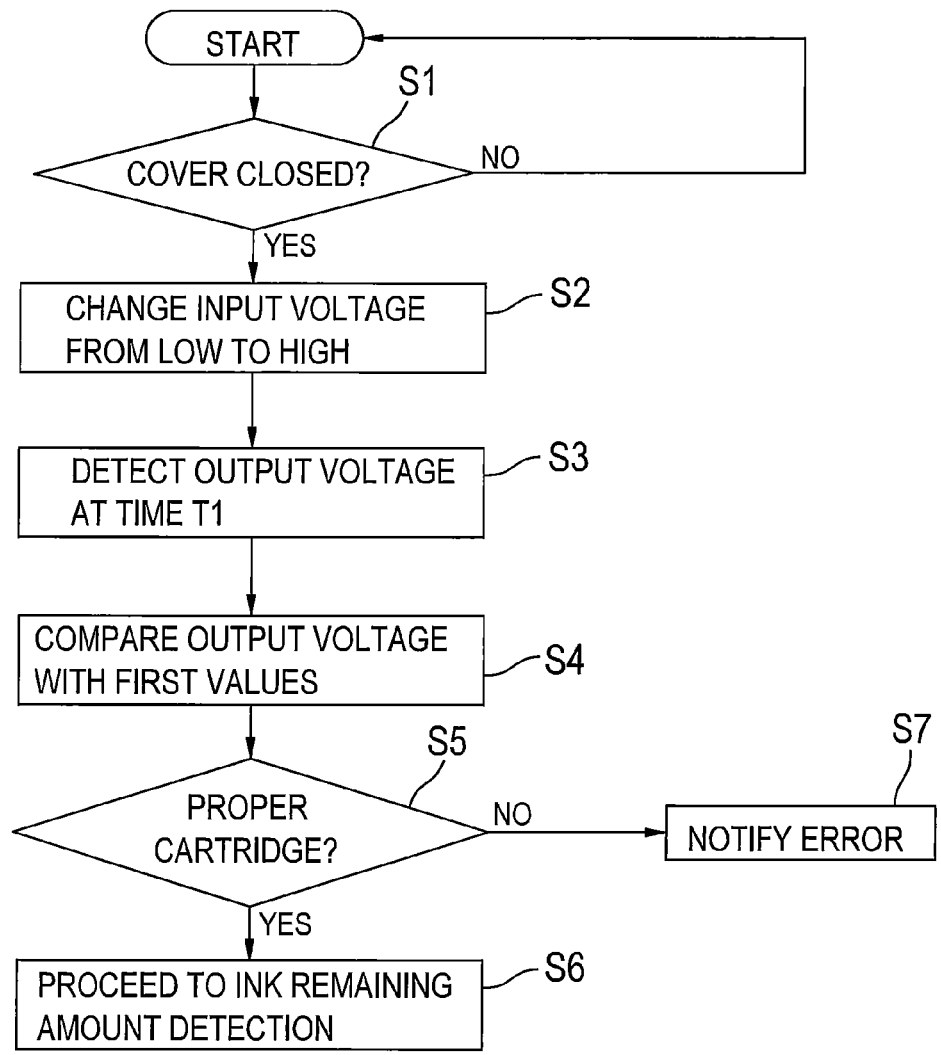
FIG. 7A is a flowchart illustrating steps in a process for detecting an electrostatic capacitance of the pyroelectric portion using the first detection circuit shown in FIG. 4.
Figures 7B, 8B:
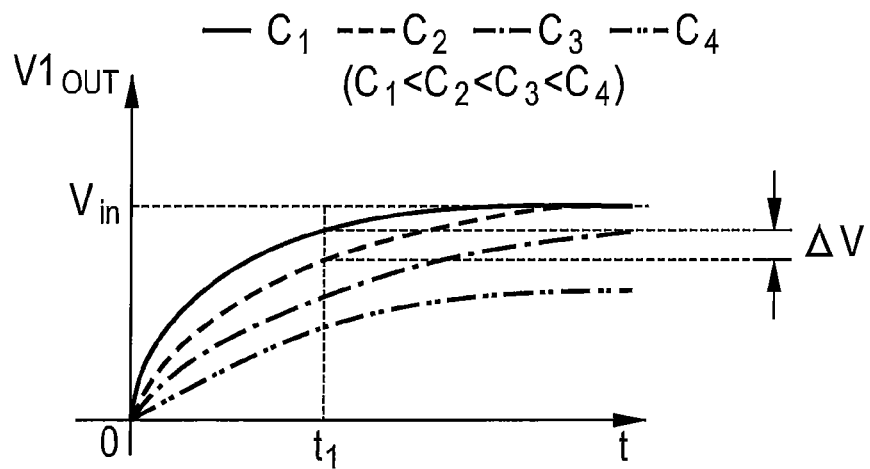
FIG. 7B is a graph showing how each pyroelectric portion is charged in accordance with its electrostatic capacitance during the detection process shown in FIG. 7A.
FIG. 8B is an explanatory view illustrating with what kind of frequencies of pulses are outputted from each pyroelectric portion in accordance with its electrostatic capacitance during the detection process shown in FIG. 8A.

Referring to FIG. 7A, when the cover (not shown) of the cartridge accommodating section 40 is opened for replacing the ink cartridge 60 with a new one, a process for detecting the electrostatic capacitance of the pyroelectric portion 71 of the newly mounted ink cartridge 60 is initiated. This process does not proceed, however, until the cover is closed (S1:NO). When the cover is closed (S1:YES), the switch 53 closes the first detection circuit 51 to be operative and the controller 81 controls the first drive circuit 82 to apply a voltage $V_{IN}$ to the first detection circuit 51. The first drive circuit 82 applies the stepped voltage $V_{IN}$ to the first detection circuit 51 (S2). Due to the voltage $V_{IN}$ applied to the pyroelectric portion 71, the latter is gradually charged.

FIG. 7B shows how each pyroelectric portion 71 corresponding to each color is charged depending on the electrostatic capacitance thereof. In FIG. 7B, each pyroelectric portion 71 associated with each color is given an electrostatic capacitance C1, C2, C3 and C4, where C1 is the smallest, while C4 is the greatest. The electrostatic capacitance C1 represents the ink cartridge 60 for black, C2 for yellow, C3 for cyan and C4 for magenta. As shown in FIG. 7B, the voltages $V_{C1-C4}$ outputted from the output terminal $V1_{OUT}$ at time t1 are different from one another depending upon the electrostatic capacitances C1-C4. When the controller 81 detects the voltage $V_{C1-C4}$ at time t1 in S3, in S4 the controller 81 compares the detected voltage $V_{C1-C4}$ associated with each electrostatic capacitance C1-C4 with each first value listed in the first determination table and determines in S5 whether the mounted new ink cartridge 60 is proper.

If the detected voltage $V_{C1-C4}$ does not match any of the first values (S5:NO), the controller 81 determines that the mounted ink cartridge is irrelevant, notifying a user that the irrelevant ink cartridge is mounted, for example, by using a display (S7). If the mounted ink cartridge 60 is determined to be correct (S5:YES), the controller 81 launches various initial operations necessary for the recording apparatus 1 to perform an image recording operation on the recording medium 14, such as positioning of the carriage and an purge operation. At this time, the controller 81 can now move on to the detection of the amount of ink left in the mounted ink cartridge 60 (S6).

Figure 8A:
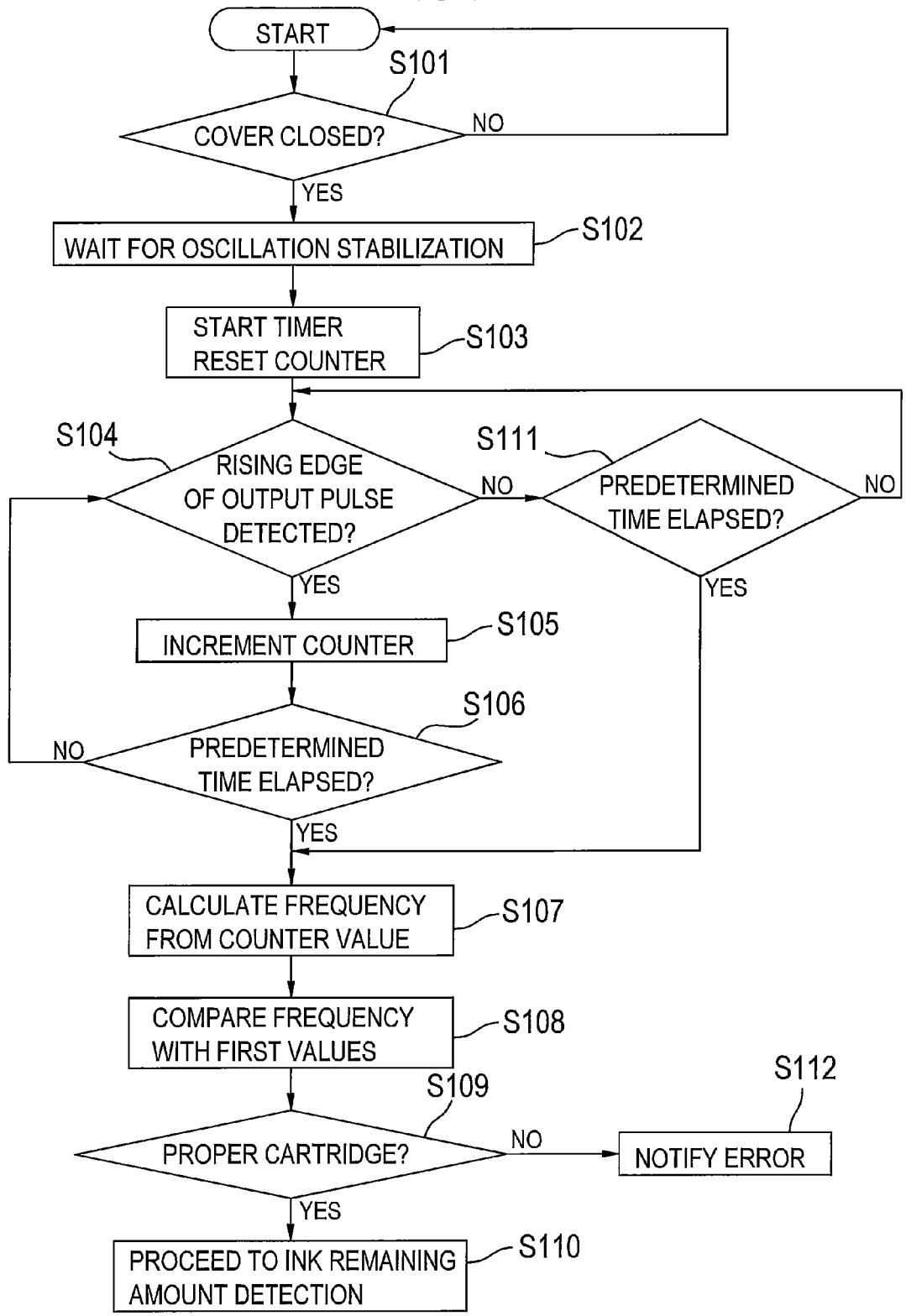
FIG. 8A is a flowchart illustrating steps in a process for detecting the electrostatic capacitance of the pyroelectric portion using the first detection circuit shown in FIG. 5.

Next, the process for detecting the electrostatic capacitance of the pyroelectric portion 71 using the oscillation circuit 54 of FIG. 5 will be described with reference to FIGS. 8A and 8B.

As in the detection process of FIG. 7A, the detection of the electrostatic capacitance using the oscillation circuit 54 is initiated when the cover (not shown) of the cartridge accommodating section 40 is opened. Until the cover is closed, the process does not proceed (S101:NO).

When the cover is closed (S101:YES), the switch 53 closes the oscillation circuit 54 to be operative and the controller 81 controls the first drive circuit 82 to apply a voltage $V_{IN}$ to the oscillation circuit 54 and waits for the oscillation circuit 54 to be stabilized (S102).

Once the oscillation circuit 54 is stabilized, the timer 87 is started and the controller 81 resets the counter 88 (S103). The counter 88 is incremented each time when a rising edge of a pulse is detected (S104, S105), and the controller 81 checks whether a predetermined period of time t2 has elapsed using the timer 87. If the timer 87 indicates that the predetermined period of time t2 has not yet elapsed (S106:NO), the controller 81 moves back to S104 to see whether another rising edge of the pulse is detected, and increments the counter 88 by one when detecting another rising edge of the pulse (S105). In this way, the controller 81 continues the steps S104-S106 until the predetermined period of time t2 has elapsed.

When the predetermined period of time t2 has elapsed (S106:YES), in S107 the controller 81 calculates a frequency (or period) of the pulse trains based on how many times the rising edge of the pulse trains has been counted (i.e. a value of the counter 88) during the predetermined period of time t2.

FIG. 8B shows four kinds of frequencies (waveforms) outputted from the output terminal $V1_{OUT}$ in accordance with each electrostatic capacitance (i), (ii), (iii) and (iv). As described above, each pulse represented by each waveform is outputted in accordance with the electrostatic capacitance of each pyroelectric portion 71. In other words, detecting the frequency (waveform) of each pulse leads to detection of colors of the mounted ink cartridge 60.

The first determination table stores first values each representing each frequency (waveforms (i) through (iv)) and associated with one of the four colors of black, yellow, cyan and magenta. For example, as shown in FIG. 8B, if the pulse trains outputted from the output terminal $V1_{OUT}$ are detected to have a frequency represented by the waveform (iii), this means that the color of the mounted ink cartridge 60 is determined to be cyan.

In S108, the controller 81 compares the detected frequency (the value of the counter 88) with the first values stored in the first determination table to determine whether the mounted ink cartridge 60 is proper.

If the detected frequency does not match any of the first values (S109:NO), the controller 81 determines that the mounted ink cartridge 60 is irrelevant, notifying a user that the irrelevant ink cartridge is mounted, for example, by using a display (S112). If the mounted ink cartridge 60 is determined to be correct (S109:YES), the controller 81 launches various initial operations necessary for the recording apparatus 10 to perform an image recording operation on the recording medium 14, such as positioning of the carriage and the purge operation. At this time, the controller 81 can now move on to the detection of the amount of ink left in the mounted ink cartridge 60 (S110).

On the other hand, in S104, if no rising edge is detected (S104:NO), whether the predetermined period of time t2 has elapsed is detected in S111. If the predetermined period of time t2 has not yet elapsed (S111:NO), the flow goes back to S104 to see whether the rising edge of the pulse is detected. If no rising edge is detected even after the predetermined period of time t2 has elapsed (S111:YES), the controller 81 jumps to S107 to calculate the frequency of the output pulse.

Figure 9:
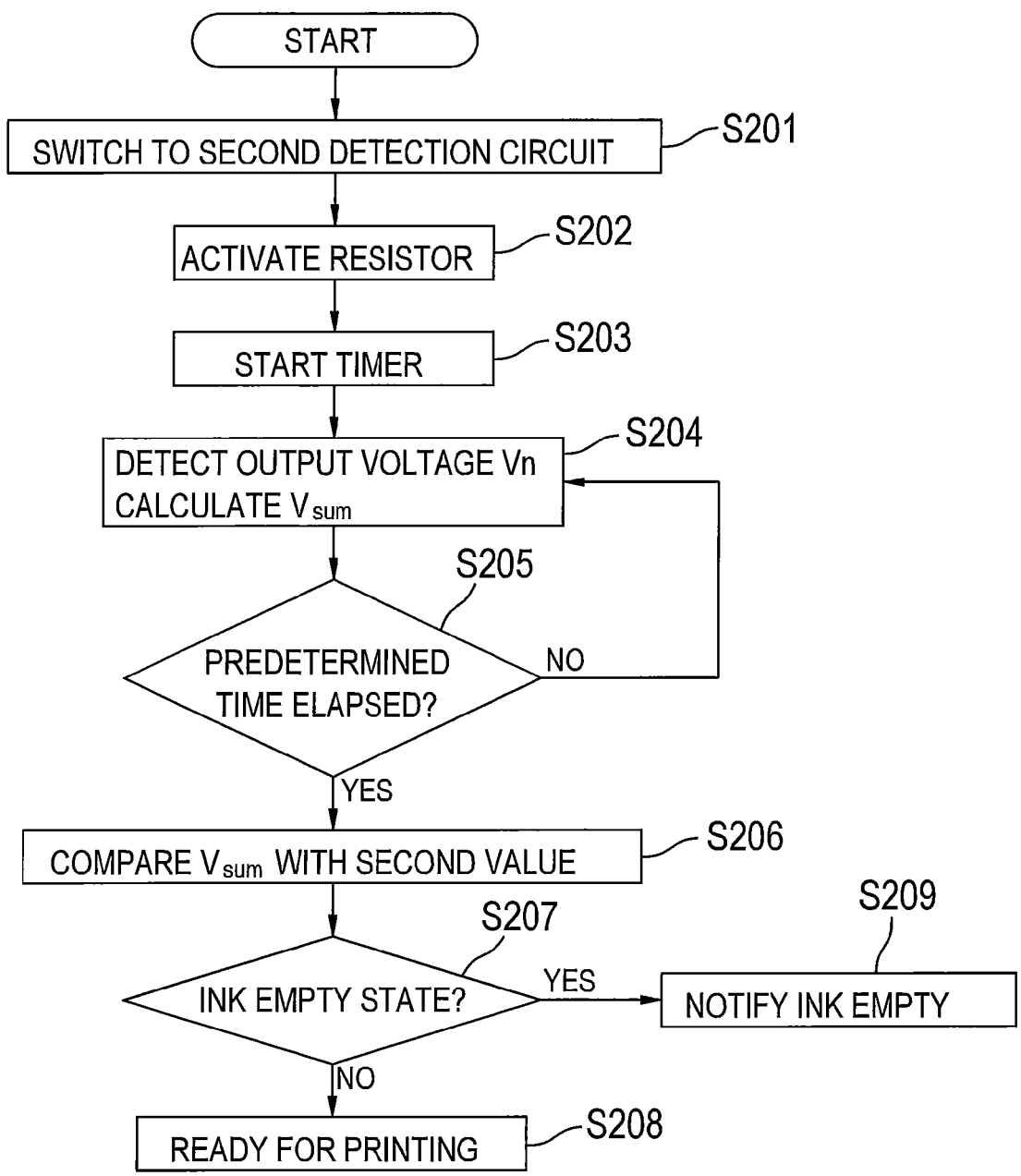
FIG. 9 is a flowchart illustrating steps in a process for determining whether the amount of ink in the ink cartridge is in an ink empty state, using the second detection circuit shown in FIGS. 4 and 5.

A process to detect the remaining amount of ink in the ink chamber 90 is configured to be initiated after the ink cartridge 60 mounted in the cartridge accommodating section 40 is determined to be proper (after S6 or S110), or an image forming operation is instructed by the user. Hereinafter, the process for detecting the remaining amount of ink will be described with reference to FIG. 9.

When the remaining amount of ink detection is initiated, the controller 81 controls the switch 53 such that the pyroelectric portion 71 is connected to the second detection circuit 52 (S201). The controller 81 then controls the second drive circuit 83 to supply power to the resistor 76 (S202). In S203, the timer 87 is started. Once the timer 87 starts to run, in S204 the controller 81 detects a voltage $V_N$ outputted from the output terminal $V2_{OUT}$ and calculates a sum voltage $V_{SUM}$, which is a sum of the latest output voltage $V_N$ and a voltage $V_{N-1}$ outputted immediately before the output voltage $V_N$, until a predetermined period of time t3 has elapsed.

When the predetermined period of time t3 elapsed (S205:YES), the controller 81 compares the sum voltage $V_{SUM}$ with the second value (threshold value) stored in the second determination table in S206 to determine whether or not the amount of ink in the mounted ink cartridge 60 is in the ink empty state. The sum voltage $V_{SUM}$ becomes greater than the second value in S207 when the amount of ink is in the ink empty state since the heat conductor 78 is not immersed in the ink. In other words, the heat generated by the resistor 76 is no longer absorbed by the ink, but is conducted to the pyroelectric portion 71 via the sensor board 74.

When the sum voltage $V_{SUM}$ is smaller than or equal to the second value (S207:NO), the controller 81 determines in S208 that there still remains enough amount of ink in the mounted ink cartridge 60. The recording apparatus 10 can therefore perform the image recording operation in accordance with instructions inputted by an input button (not shown) or via an external device such as a personal computer.

On the other hand, when the sum voltage $V_{SUM}$ is greater than the second value (S207:YES), the controller 81 determines that the amount of ink in the mounted ink cartridge 60 is in the ink empty state. The controller 81 therefore informs the user in S209 that the ink is running out and prompts replacement of the mounted ink cartridge 60.

[Effects of Present Embodiment]

As described above, the ink cartridge 60 according to the embodiment includes the sensor board 74 and the heat conductor 78. The sensor board 74 and the heat conductor 78 have at least a portion in contact with or disposed adjacent to the bottom wall 61D of the cartridge casing 61. With this configuration, the heat conductor 78 is in contact with the ink stored in the ink chamber 90 even if there only a little amount of ink left in the ink chamber 90. In this state, the heat generated at the resistor 76 is mostly conducted to the ink stored in the ink chamber 90 via the sensor board 74 and the heat conductor 78. That is, at this time, little amount of heat is conducted from the heat conductor 78 to the pyroelectric portion 71. Accordingly, the temperature elevation of the pyroelectric portion 71 can be restrained.

On the other hand, when the heat conductor 78 is not immersed in the ink stored in the ink chamber 90, heat conducted to the heat conductor 78 can no longer be conducted to the ink because there is no ink left in the ink chamber 90. As a result, the heat conducted to the heat conductor 78 is conducted to the pyroelectric portion 71 via the sensor board 74, thereby significantly increasing the temperature of the pyroelectric portion 71, compared with the situation where there sufficiently remains ink in the ink chamber 90.

The greater the pyroelectric portion 71 exhibits change in temperature due to the heat conduction, the greater the pyroelectric portion 71 exhibits development in voltage due to the pyroelectric effect. That is, change in an electrical signal (output voltage) outputted from the pyroelectric portion 71 becomes greater. To the contrary, the less the pyroelectric portion 71 exhibits change in temperature, the less the pyroelectric portion 71 exhibits development in voltage. That is, change in the electrical signal outputted from the pyroelectric portion 71 becomes less.

According to the above-described embodiment, in such a state that the heat conductor 78 is in contact with the ink stored in the ink chamber 90, the pyroelectric portion 71 exhibits a little change in the electrical signal outputted from the pyroelectric portion 71, whereas in such a state that the heat conductor 78 is not in contact with the ink, the pyroelectric portion 71 exhibits great change in the electrical signal outputted from the pyroelectric portion 71.

As described above, whether the amount of ink in the ink chamber 90 is in the ink empty state can be accurately detected based on the change in the electrical signal outputted from the pyroelectric portion 71.

Further, the ink cartridge 60 according to the present embodiment is provided with the resistor 76. By applying current to the resistor 76, the resistor 76 can generate heat, and the heat generated at the resistor 76 can be easily conducted to the heat conductor 78 via the sensor board 74.

Further, the recording apparatus 10 according to the present embodiment controls power supply to the resistor 76 to generate heat therefrom, and determines based on the electrical signals outputted from the pyroelectric portion 71 whether or not the amount of ink in the ink chamber 90 is in the ink empty state. As described above, whether or not the amount of ink in the ink chamber 90 is in the ink empty state can be accurately detected based on the change in electrical signal outputted from the pyroelectric portion 71. Accordingly, the recording apparatus 10 can accurately determine whether or not the amount of ink in the ink chamber 90 is in the ink empty state.

Thus, the recording apparatus 10 can notify the user of the ink empty state of the ink cartridge 60 mounted in the cartridge accommodating section 40.

Further, the recording apparatus 10 according to the present embodiment is provided with the detection scheme 50 and the controller 81. Therefore, the recording apparatus 10 can detect the type of the mounted ink cartridge 60 as well as the ink empty state of the mounted ink cartridge 60. The recording apparatus 10 according to the present embodiment can also detect wrong installation of the ink cartridge 60 and prompt the user to replace the incorrectly mounted ink cartridge 60.

Various modifications are conceivable.

[First Modification]

Figure 10:
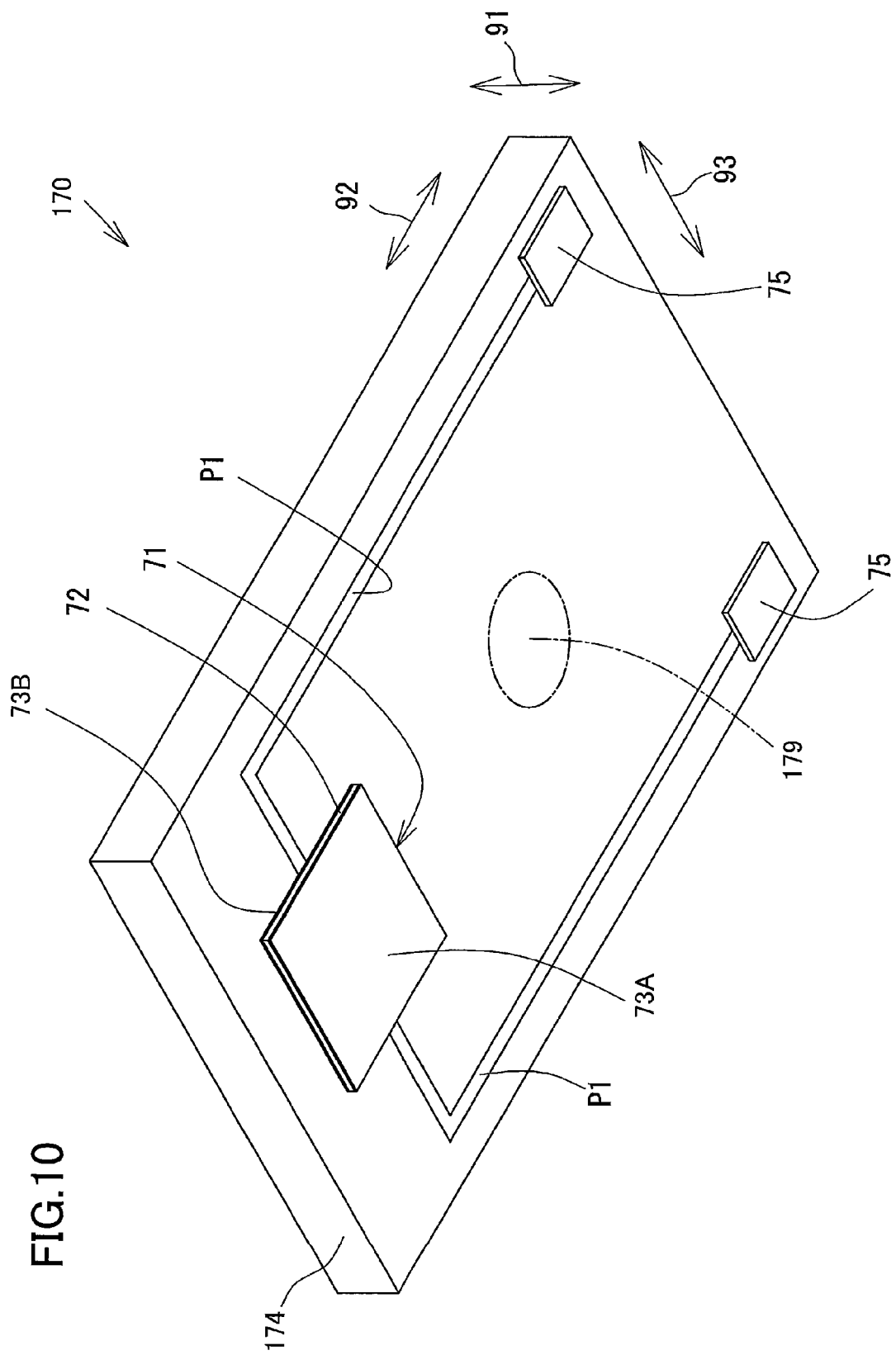
FIG. 10 is a schematic perspective view of a sensor chip according to a first modification of the embodiment.

A first modification of the above-described embodiment will next be described while referring to FIG. 10. FIG. 10 shows a sensor board 174 of a sensor chip 170 attached to a cartridge casing 161 (not shown) of an ink cartridge 160 (not shown) according to the first modification. In the following description, only parts differing from those of the above-described embodiment will be described.

In the above-described embodiment, the resistor 76 is mounted on the sensor board 74. However, in the first modification, a resistor 176 (not shown) is provided at the cartridge accommodating section 140 (not shown) of the recording apparatus 110 (not shown).

The sensor board 174 is formed with a heat receiving area 179 with which the resistor 176 disposed on the cartridge accommodating section 140 is brought into direct contact when the ink cartridge 160 is mounted in the cartridge accommodating section 140. The resistor 176 may not necessarily be in direct contact with the heat receiving area 179, but a separate member to which heat from the resistor 176 is conducted may also be provided so as to be in contact with the heat receiving area 179.

In place of the resistor 176, an infrared ray-emitting diode may be provided at the cartridge accommodating section 140.

Since the resistor 176 is provided in the cartridge accommodating section 140, the fourth electrical interfaces 77 are no longer necessary to be provided at the sensor board 174 of the first modification. Therefore, the sensor board 174 of the first modification can realize a configuration simpler than that of the sensor board 74 of the above described embodiment. As a result, the configuration of the ink cartridge 160 can also be made simpler.

[Second Modification]

Figure 11:
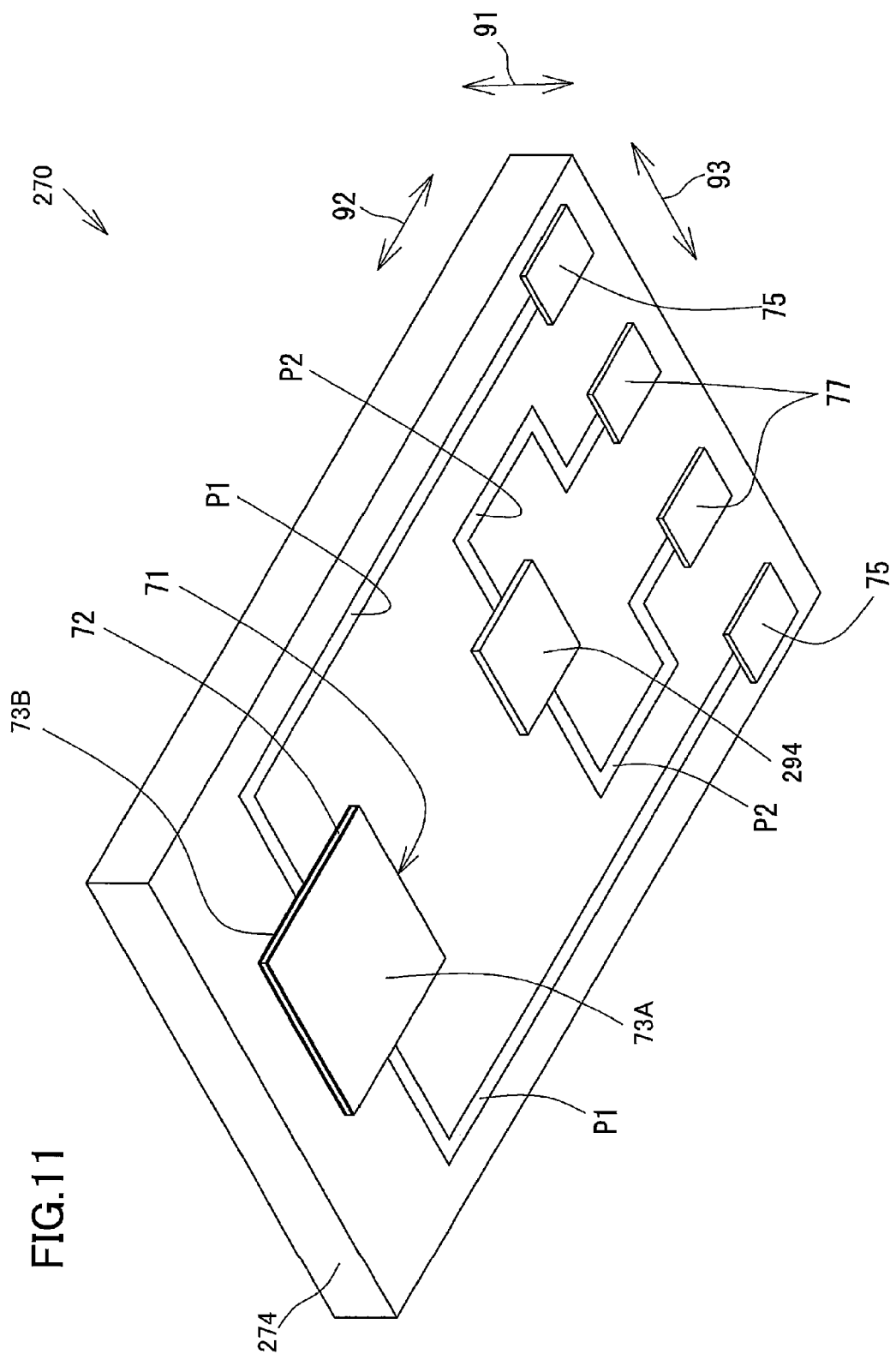
FIG. 11 is a schematic perspective view of a sensor ship according to a second modification of the embodiment.

A second modification of the above-described embodiment will next be described while referring to FIG. 11. FIG. 11 shows a sensor board 274 of a sensor chip 270 mounted on a cartridge casing 261 (not shown) of an ink cartridge 260 (not shown) according to the second modification. In the following description, only parts differing from those of the above-described embodiment will be described.

In the above-described embodiment, the heat generated by the resistor 76 is conducted to ink stored in the ink chamber 90 when there remains ink in the ink chamber 90, whereas the heat generated by the resistor 76 is conducted to the pyroelectric portion 71 when there is no ink left in the ink chamber 90. However, in the second modification, the sensor board 274 of the sensor chip 270 includes an infrared ray-emitting diode 294, instead of the resistor 76. The infrared ray-emitting diode 294 is adapted to irradiate an infrared ray toward the sensor board 274.

In the second modification, a control circuit 280 (not shown) includes a diode drive circuit (not shown), instead of the second drive circuit 83, for driving the infrared ray-emitting diode 294. The diode drive circuit can be a constant voltage circuit or a constant current circuit.

When determining whether or not the amount of ink in the ink chamber 90 of the ink cartridge 260 is in the ink empty state, the controller 81 controls the diode drive circuit (not shown) to drive the infrared ray-emitting diode 294 to heat the sensor board 274. When the heat conductor 78 is in contact with the ink, that is, there is a sufficient amount of ink in the ink chamber 90, there is little change in temperature of the pyroelectric portion 71, and the pyroelectric portion 71 outputs little output voltage. When the heat conductor 78 is not in contact with the ink, that is, when the amount of ink in the ink chamber 90 is in the ink empty state, the heat generated by the infrared ray-emitting diode 294 is conducted to the pyroelectric portion 71 via the sensor board 274, thereby developing a voltage between the pair of film electrodes 73A, 73B. In this way, the voltage outputted from the pyroelectric portion 71 changes depending on whether or not the amount of ink in the ink chamber 90 is in the ink empty state. The controller 81 detects the output voltage of the pyroelectric portion 71 by the second detection circuit 52, and determines whether or not the amount of ink in the ink chamber 90 is in the ink empty state. In the second modification, determination on the type of the ink cartridge 260 is performed in the same manner as in the above-described embodiment.

[Third Modification]

A third modification of the above-described embodiment will next be described. In the following description, only parts differing from those of the above-described embodiment will be described.

In the second modification, the infrared ray-emitting diode 294 is adapted to irradiate infrared ray to heat the sensor board 274, and the heat conducted to the sensor board 274 is conducted to the ink stored in the ink chamber 90 via the heat conductor 78 and to the pyroelectric portion 71. However, in the third modification, instead of separately providing the heat conductor 78 in the ink cartridge 60, one of walls of a cartridge casing 361 (not shown) of an ink cartridge 360 (not shown), for example, a bottom wall 361D (not shown), can be used as a heat conductor. The pyroelectric portion 71 and an infrared ray-emitting diode 394 (not shown) are provided at a contact surface 374B (not shown) of a sensor board 374 (not shown). The pyroelectric portion 71 is arranged so as to be in contact with the bottom wall 361D. The infrared ray-emitting diode 394 is mounted on the contact surface 374B to irradiate an infrared ray directly toward the bottom wall 361D of the cartridge casing 361.

The bottom wall 361D of the cartridge casing 361 heated upon incidence of the infrared ray has little increase in temperature when there is a sufficient amount of ink in the ink chamber 90 of the ink cartridge 360. Accordingly, the pyroelectric portion 71 outputs little output voltage. On the other hand, the temperature of the heated bottom wall 361D of the cartridge casing 361 increases when the amount of ink in the ink chamber 90 is in ink the empty state, so that the output voltage outputted from the pyroelectric portion 71 increases.

After controlling the diode drive circuit to drive the infrared ray-emitting diode 394, the controller 81 detects the output voltage or a rate of change of the output voltage outputted from the pyroelectric portion 71 at the second detection circuit 52 to determine whether or not the amount of ink in the ink chamber 90 is in the ink empty state.

[Fourth Modification]

Figure 12:
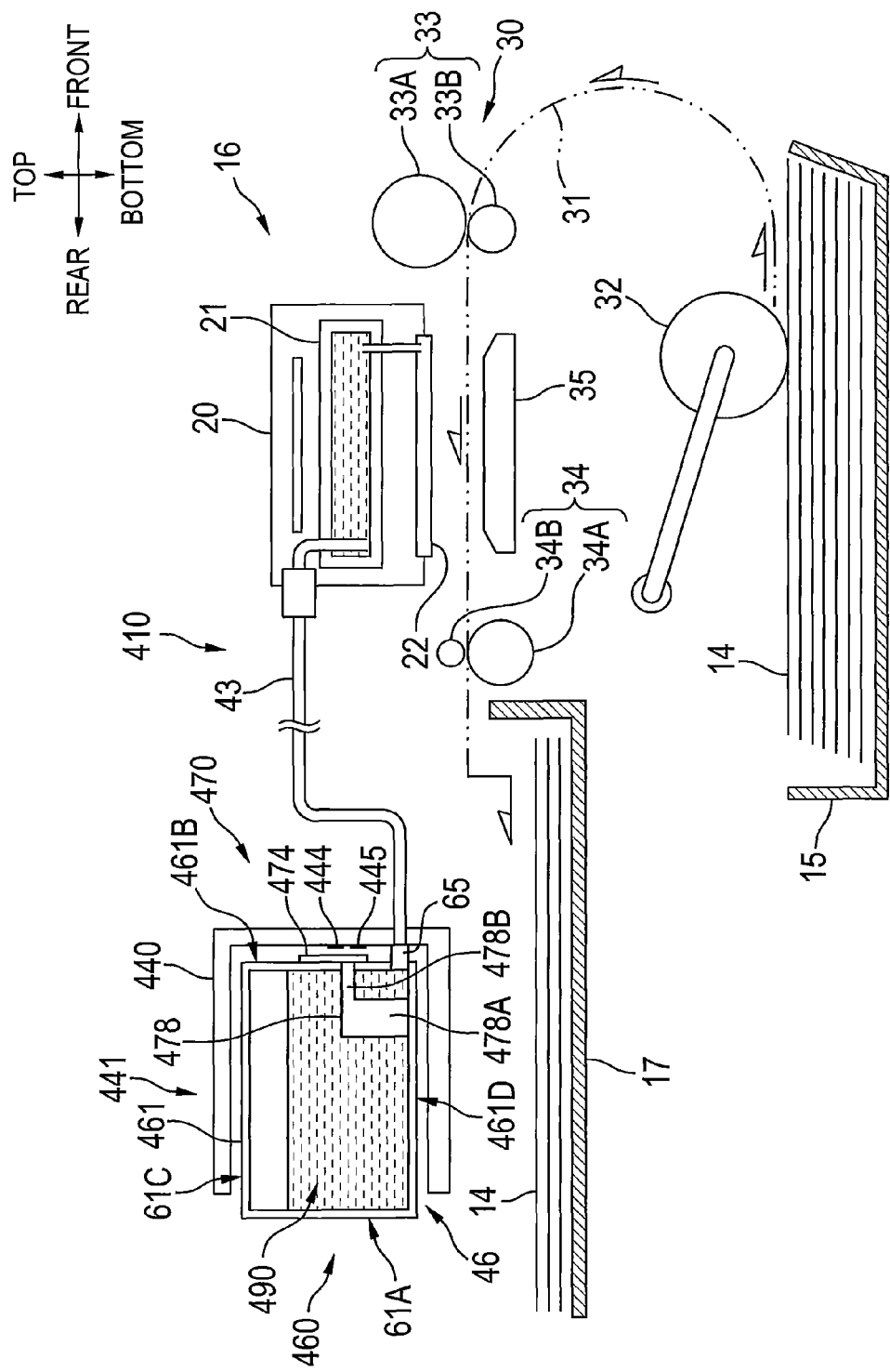
FIG. 12 is a schematic cross-sectional view of a recording apparatus according to a fourth modification of the embodiment, in which an ink cartridge according to the fourth modification is accommodated in a cartridge accommodating section of the recording apparatus.

A fourth modification of the above-described embodiment will next be described while referring to FIG. 12. FIG. 12 shows a recording apparatus 410 and an ink cartridge 460 accommodated in a cartridge accommodating section 440 of the recording apparatus 410 according to the fourth modification. In the following description, only parts differing from those of the above-described embodiment will be described.

In the above described embodiment, as shown in FIGS. 1 and 2, the heat conductor 78 is disposed at the bottom portion of the cartridge casing 61, and the lower surface of the base portion 78A is in contact with the upper surface of the bottom wall 61D. However, as long as the heat conductor 78 has at least a portion in contact with or disposed adjacent to the upper surface of the bottom wall 61D, the configuration of the heat conductor 78 is not limited to that shown in FIGS. 1 and 2.

For example, the sensor chip 470 can be fixed to a front (outer) surface of a front wall 461B of a cartridge casing 461. In the fourth modification, a pair of positioning claws 463 (not shown) and a pair of engaging claws 464 (not shown) are provided on the front wall 461B. Each positioning claw 463 has a base portion protruding from the front wall 461B frontward and a claw portion 463A protruding from the base portion toward the confronting engaging claw 464. Likewise, each engaging claw 464 has a base portion protruding from the front wall 461B frontward and a claw portion 464A protruding from the base portion toward the confronting positioning claw 463. The sensor board 474 is held to the front wall 461B of the cartridge casing 461 by being engaged between the pair of positioning claws 463 and the pair of engaging claws 464. Further, a pair of first electrical interfaces 444 and a pair of third electrical interfaces 445 are provided at the cartridge accommodating section 440 such that the pair of first electrical interfaces 444 and the pair of third electrical interfaces 445 are brought into contact with a pair of second electrical interfaces 475 (not shown) and a pair of fourth electrical interfaces 477 (not shown) mounted on the sensor board 474 when the ink cartridge 460 is mounted in the cartridge accommodating section 440.

Further, as shown in FIG. 12, the sensor chip 470 includes a sensor board 474 on which a pyroelectric portion 471 (not shown) and a resistor 476 (not shown) is mounted and a heat conductor 478. The heat conductor 478 is disposed in the cartridge casing 461. The heat conductor 478 is formed in a plate-shape to form an L-shape. Alternatively, the heat conductor 478 may be formed in a bar-shape as long as the heat conductor 478 has an L-shape. The L-shaped heat conductor 478 has a penetrating portion 478B penetrating the front wall 461B and a protruding portion 478A protruding downward from the penetrating portion 478B. The penetrating portion 478B has a portion in contact with the sensor board 474. Alternatively, the penetrating portion 478B may have a portion disposed to be adjacent to the sensor board 474. The protruding portion 478A is arranged to be accommodated in an ink chamber 490 defined in the cartridge casing 461. The penetrating portion 478B is positioned so as to extend horizontally rearward from the sensor board 474. The protruding portion 478A protrudes downward from the penetrating portion 478B so that a bottom end of the protruding portion 478A is in contact with an upper (inner) surface of the bottom wall 461D. That is, the protruding portion 478A has a portion in contact with the bottom of the ink chamber 490. With this configuration, whether or not the amount of ink remaining in the ink chamber 490 is in the ink empty state can be detected in the same manner as described in the above embodiment.

Further, preferably, the heat conductor 478 is positioned adjacent to the ink supply portion 65. As shown in FIG. 12, the heat conductor 478 is provided in the ink chamber 490 such that the heat conductor 478 is disposed adjacent to the front wall 461B that is located at a leading side in the mounting direction of the ink cartridge 460 in the cartridge accommodating section 440 as well as disposed adjacent to the bottom wall 461D. Hence, the heat conductor 478 can be positioned close to the ink supply portion 65 disposed at a lower portion of the front wall 461B.

The sensor board 474 and the heat conductor 478 constitutes a heat conductor, and forms a heat conduction path between the pyroelectric portion 471 and the ink stored in the ink chamber 490 for conducting heat generated at the resistor 476 to the pyroelectric portion 471 and to the ink.

Incidentally, the sensor board 474 according to this modification is provided with the resistor 476. However, instead of the resistor, an infrared ray-emitting diode may be used. Further, the resistor 476 may not be provided at the sensor board 474 but at the cartridge accommodating section 440.

[Fifth Modification]

A fifth modification of the above-described embodiment will next be described. In the following description, only parts differing from those of the above-described embodiment will be described.

In the above-described embodiment, as shown in FIG. 1, the upper surface of the heat conductor 78 (the base portion 78A) extends horizontally. However, as long as the heat conductor 78 has at least a portion in contact with or disposed adjacent to the bottom wall 61D, the upper surface of the heat conductor 78 is not limited to be horizontal. For example, a heat conductor 578 (not shown) may have an upper surface that is inclined and extends diagonally below and forward from rear to front. This configuration aims for improvement in consumption of the ink remaining in an ink chamber 590 (not shown) defined in a cartridge casing 561 (not shown) of an ink cartridge 560 (not shown), and facilitates using up the ink left in the ink chamber 590.

[Variations]

Structural variations of the ink cartridge 60 will next be described while referring to FIGS. 13A to 13D. In the following description, only parts differing from those of the above-described embodiment will be described.

[1st Variation]

Figure 13B:
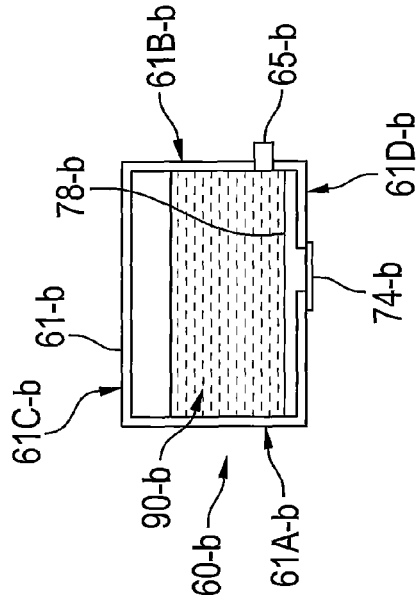
FIGS. 13A to 13D are explanatory diagrams of the ink cartridges, showing variations in structure of the ink cartridge for detecting the ink empty state.
Figure 13D:
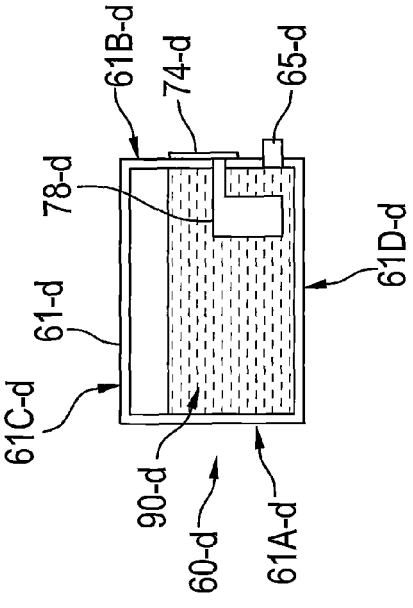
Figure 13A:
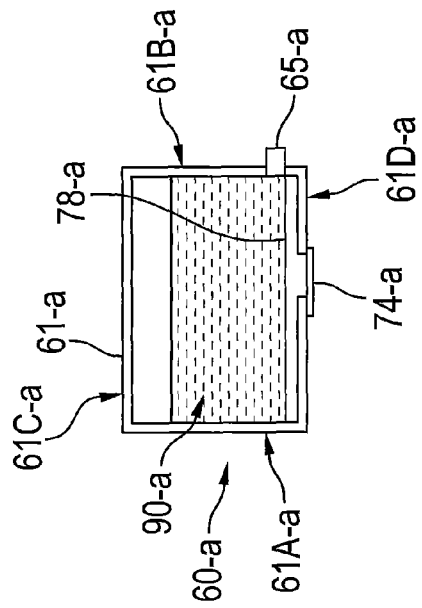

An ink cartridge 60-a shown in FIG. 13A has a structure the same as that of the ink cartridge 60 described in the above embodiment. The ink cartridge 60-a has a cartridge casing 61-a defining an internal space as an ink chamber 90-a by a top wall 61C-a, a bottom wall 61D-a, a rear wall 61A-a, a front wall 61B-a, a right side wall 61E-a (not shown), and a left side wall 61F-a (not shown). The cartridge casing 61-a has an ink supply portion 65-a that is disposed at the lowest portion of the front wall 61B-a. More specifically, the ink supply portion 65-a is positioned in the front wall 61B-a such that the ink in the ink chamber 90-a can be flowed out of the ink chamber 90-a through the ink supply portion 65-a until the ink is fully used up.

The ink cartridge 60-a is provided with a sensor board 74-a and a heat conductor 78-a. The heat conductor 78-a is disposed at the bottom of the ink chamber 90-a. Hence, the heat conductor 78-a is immersed in the ink stored in the ink chamber 90-a even when only a little amount of ink remains in the ink chamber 90-a, and is exposed to the atmosphere in the ink chamber 90-a when there is no ink remaining in the ink chamber 90-a.

With the above-described structure, when the amount of ink in the ink chamber 90-a is reduced to the ink empty state (fully-empty state in this variation), the heat generated at the resistor 76-a (not shown) is conducted to the pyroelectric portion 71-a (not shown) at the maximum, thereby causing the temperature of the pyroelectric portion 71-a to increase. Hence, the controller 81 can detect the ink empty state.

Since the ink cartridge 60-a has a structure suitable for detecting the fully-empty state, the controller 81 can accurately detect the fully-empty state of the ink cartridge 60-a such that no ink remains in the ink chamber 90-a and thus the ink cartridge 60-a is incapable of supplying ink to the recording head 20.

[2nd Variation]

An ink cartridge 60-b shown in FIG. 13B has a structure the same as that of the ink cartridge 60-a, except for the position of the ink supply portion 65-a.

The ink cartridge 60-b has a cartridge casing 61-b defining an internal space as an ink chamber 90-b by a top wall 61C-b, a bottom wall 61D-b, a rear wall 61A-b, a front wall 61B-b, a right side wall 61E-b (not shown), and a left side wall 61F-b (not shown). The cartridge casing 61-b has an ink supply portion 65-b that is disposed at a lower portion of the front wall 61B-b. Compared with the ink supply portion 65-a, the ink supply portion 65-b is positioned slightly upward in the heightwise direction 9. More specifically, the ink supply portion 65-b is positioned in the front wall 61B-b such that the ink in the ink chamber 90-b cannot be flowed out of the ink chamber 90-b through the ink supply portion 65-b when an amount of the ink remaining in the ink chamber 90-b is so small.

The ink cartridge 60-b is provided with a sensor board 74-b and a heat conductor 78-b. The heat conductor 78-b is disposed at the bottom of the ink chamber 90-b. Hence, the heat conductor 78-b is immersed in the ink stored in the ink chamber 90-b when ink remains in the ink chamber 90-b. Due to the position of the ink supply portion 65-b, the heat conductor 78-b is never exposed from the ink. However, depending on the amount of ink remaining in the ink chamber 90-b, the amount of heat to be transmitted from the resistor 76-b (not shown) to the pyroelectric portion 71-b (not shown) changes. The less the amount of ink remaining in the ink chamber 90-b becomes, the greater the amount of heat to be transmitted from the resistor 76-b to the pyroelectric portion 71-b becomes.

When the amount of ink in the ink chamber 90-b is reduced to the ink empty state (near-empty state in this variation), the heat generated at the resistor 76-b is conducted to the pyroelectric portion 71-b at the maximum, thereby causing the temperature of the pyroelectric portion 71-b to increase. Hence, the controller 81 can detect the ink empty state.

Since the ink cartridge 60-b has a structure suitable for detecting the near-empty state, the controller 81 can accurately detect the near-empty state of the ink cartridge 60-b such that the ink remaining in the ink chamber 90-b is no longer flowed out of the ink chamber 90-b through the ink supply portion 65-b and the ink is no longer supplied to the recording head 20.

[3rd Variation]

Figure 13C:
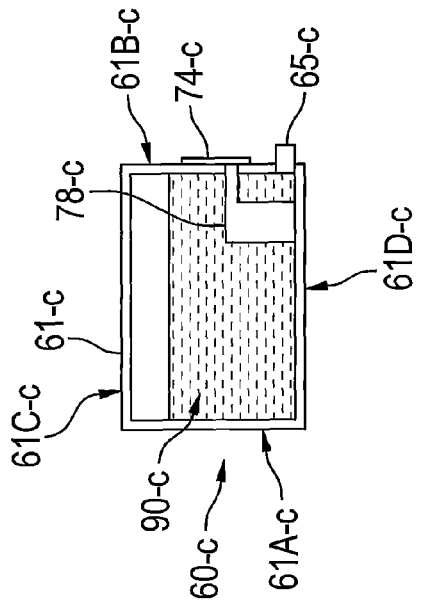

An ink cartridge 60-c shown in FIG. 13C has a structure the same as that of the ink cartridge 460 described in the fourth modification. The ink cartridge 60-c has a cartridge casing 61-c defining an internal space as an ink chamber 90-c by a top wall 61C-c, a bottom wall 61D-c, a rear wall 61A-c, a front wall 61B-c, a right side wall 61E-c (not shown), and a left side wall 61F-c (not shown). The cartridge casing 61-c has an ink supply portion 65-c that is disposed at the lowest portion of the front wall 61B-c. More specifically, the ink supply portion 65-c is positioned in the front wall 61B-c such that the ink in the ink chamber 90-c can be flowed out of the ink chamber 90-c through the ink supply portion 65-c until the ink is fully used up.

The ink cartridge 60-c is provided with a sensor board 74-c and a heat conductor 78-c. The heat conductor 78-c has a bottom end that is in contact with the bottom of the ink chamber 90-c. Hence, the heat conductor 78-c is immersed in the ink stored in the ink chamber 90-c even when only a little amount of ink remains in the ink chamber 90-c, and is exposed to the atmosphere in the ink chamber 90-c when there is no ink remaining in the ink chamber 90-c.

With the above-described structure, when the amount of ink in the ink chamber 90-c is reduced to the ink empty state (fully-empty state in this variation), the heat generated at the resistor 76-c (not shown) is conducted to the pyroelectric portion 71-c (not shown) at the maximum, thereby causing the temperature of the pyroelectric portion 71-c to increase. Hence, the controller 81 can detect the ink empty state.

Since the ink cartridge 60-c has a structure suitable for detecting the fully-empty state, the controller 81 can accurately detect the fully-empty state of the ink cartridge 60-c such that no ink remains in the ink chamber 90-c and thus the ink cartridge 60-c is incapable of supplying ink to the recording head 20.

[4th Variation]

An ink cartridge 60-d shown in FIG. 13D has a structure the same as that of the ink cartridge 60-c, except for the positions of the heat conductor 78-c, the sensor board 74-c, and the ink supply portion 65-c.

The ink cartridge 60-d has a cartridge casing 61-d defining an internal space as an ink chamber 90-d by a top wall 61C-d, a bottom wall 61D-d, a rear wall 61A-d, a front wall 61B-d, a right side wall 61E-d (not shown), and a left side wall 61F-d (not shown). The cartridge casing 61-d has an ink supply portion 65-d that is disposed at a lower portion of the front wall 61B-d. Compared with the ink supply portion 65-c, the ink supply portion 65-d is positioned slightly upward in the heightwise direction 9. More specifically, the ink supply portion 65-d is positioned in the front wall 61B-d such that the ink in the ink chamber 90-d cannot be flowed out of the ink chamber 90-d through the ink supply portion 65-d when an amount of the ink remaining in the ink camber 90-d is so small.

The ink cartridge 60-d is provided with a sensor board 74-d and a heat conductor 78-d. The heat conductor 78-d has a bottom end that is not in contact with but disposed adjacent to the bottom of the ink chamber 90-d. Compared with the heat conductor 78-c, the heat conductor 78-d is positioned slightly upward in the heightwise direction 9. Alternatively, for example, by making the vertical length of the heat conductor 78-d smaller than that of the heat conductor 78-c, the position of the bottom end of the heat conductor 78-d can also be changed so as not to be in contact with the bottom of the ink chamber 90-d.

The heat conductor 78-d is immersed in the ink stored in the ink chamber 90-d when the ink remains in the ink chamber 90-d. Due to the position of the ink supply portion 65-d, the heat conductor 78-d is never exposed from the ink. However, depending on the amount of ink remaining in the ink chamber 90-d, the amount of heat to be transmitted from the resistor 76-d (not shown) to the pyroelectric portion 71-d (not shown) changes. The less the amount of ink remaining in the ink chamber 90-d becomes, the greater the amount of heat to be transmitted from the resistor 76-d to the pyroelectric portion 71-d becomes.

When the amount of ink in the ink chamber 90-d is reduced to the ink empty state (near-empty state in this variation), the heat generated at the resistor 76-d is conducted to the pyroelectric portion 71-d at the maximum, thereby causing the temperature of the pyroelectric portion 71-d to increase. Hence, the controller 81 can detect the ink empty state.

Since the ink cartridge 60-d has a structure suitable for detecting the near-empty state, the controller 81 can accurately detect the near-empty state of the ink cartridge 60-d such that the ink remaining in the ink chamber 90-b is no longer flowed out of the ink chamber 90-d through the ink supply portion 65-d and the ink is no longer supplied to the recording head 20.

The ink cartridge 60-a and the ink cartridge 60-c have structures most effective in detecting the fully-empty state. However, the near-empty state of the ink cartridges 60-a and 60-c can also be detected, for example, by prestoring a plurality of predetermined values associated with a plurality of levels of the amount of ink in the ink cartridge 60-a, 60-c in the second determination table stored in the storage 84.

While the invention has been described in detail with reference to the embodiment thereof, it would be apparent to those skilled in the art that various changes and modifications may be made therein without departing from the scope of the invention.

What is claimed is:

1. An ink cartridge comprising:
   a casing configured to store ink therein, the casing having a bottom wall;
   a pyroelectric portion configured to output an electrical signal;
   a heat conductor configured to conduct heat to the ink and the pyroelectric portion, the heat conductor having at least a portion in contact with or disposed adjacent to the bottom wall; and
   an electrical interface configured to output an electrical signal outputted from the pyroelectric portion.

2. The ink cartridge as claimed in claim 1, further comprising a heater configured to apply heat to the heat conductor, the pyroelectric portion outputting the electrical signal in response to an amount of heat conducted to the pyroelectric portion from the heat conductor.

3. The ink cartridge as claimed in claim 2, wherein the heater is a resistor, the heat conductor being applied with heat from the resistor to conduct the heat to the pyroelectric portion, the pyroelectric portion outputting the electrical signal in response to the amount of heat conducted from the heat conductor.

4. The ink cartridge as claimed in claim 2, wherein the heater is an infrared ray-emitting diode configured to irradiate an infrared ray toward the heat conductor, the heat conductor being applied with heat upon incidence of the infrared ray to conduct the heat to the pyroelectric portion, the pyroelectric portion outputting the electrical signal in response to the amount of heat conducted from the heat conductor.

5. The ink cartridge as claimed in claim 2, further comprising an ink supply portion configured to allow the ink to flow out of the casing,
   wherein the casing has a side wall, the ink supply portion being disposed at the side wall and adjacent to the bottom wall, when an amount of ink remaining in the casing is reduced to a level such that the ink is no longer flowed out of the casing through the ink supply portion, heat applied with the heat conductor by the heater being conducted to the pyroelectric portion at the maximum.

6. The ink cartridge as claimed in claim 1, wherein the bottom wall has a first surface outside the casing and a second surface inside the casing, the pyroelectric portion being disposed at the first surface of the bottom wall.

7. The ink cartridge as claimed in claim 1, wherein the casing has a side wall, the side wall having a first surface outside the casing and a second surface inside the casing, the pyroelectric portion being disposed at the first surface of the side wall.

8. The ink cartridge as claimed in claim 1, further comprising an ink supply portion configured to allow the ink to flow out of the casing, wherein the casing has a side wall, the ink supply portion being disposed at the side wall and adjacent to the bottom wall, the heat conductor being disposed adjacent to the ink supply portion.

9. A recording apparatus comprising:
   a cartridge accommodating section in which an ink cartridge of a predetermined type is detachably mountable, the cartridge accommodating section being provided with a first electrical interface, the ink cartridge comprising:
      a casing configured to store ink therein, the casing having a bottom wall;
      a pyroelectric portion configured to output an electrical signal;
      a heat conductor configured to conduct heat to the ink and the pyroelectric portion, the heat conductor having at least a portion in contact with or disposed adjacent to the bottom wall; and
      a second electrical interface configured to be electrically connected to the first electrical interface when the ink cartridge is mounted in the cartridge accommodating section so as to output an electrical signal outputted from the pyroelectric portion to the first electrical interface; and
   a controller configured to detect at least one of the type of the mounted ink cartridge and the amount of ink in the casing based on the electrical signal outputted from the pyroelectric portion to the recording apparatus via the first electrical interface when ink cartridge is mounted in the cartridge accommodating section.

10. The recording apparatus as claimed in claim 9, wherein the pyroelectric portion has a predetermined electrostatic capacitance and is configured to output a first electrical signal indicative of the predetermined electrostatic capacitance, and wherein the controller detects the type of the mounted ink cartridge based on the first electrical signal outputted from the pyroelectric portion via the first electrical interface.

11. The recording apparatus as claimed in claim 10, wherein the ink cartridge further comprises a heater configured to apply heat to the heat conductor, the pyroelectric portion being configured to output a second electrical signal indicative of the amount of ink in the casing in response to an amount of heat conducted to the pyroelectric portion from the heat conductor, the controller being configured to activate the heater; and wherein the controller determines whether or not the amount of ink in the casing is in an ink empty state based on the second electrical signal outputted from the pyroelectric portion via the first electrical interface when the controller activates the heater.

12. The recording apparatus as claimed in claim 11, wherein the ink cartridge further comprises an ink supply portion configured to allow the ink to flow out of the casing, and wherein the casing has a side wall located at a leading side in a direction that the ink cartridge is mounted in the cartridge accommodating section, the ink supply portion being disposed at the side wall and adjacent to the bottom wall, when an amount of ink remaining in the casing is reduced to a level such that the ink is no longer flowed out of the casing through the ink supply portion, the heat applied with the heat conductor by the heater being conducted to the pyroelectric portion at the maximum.

13. The recording apparatus as claimed in claim 10, wherein the cartridge accommodating section further comprises a heater configured to apply heat to the heat conductor, the pyroelectric portion being configured to output a second electrical signal indicative of the amount of ink in the casing in response to an amount of heat conducted to the pyroelectric portion from the heat conductor, the controller being configured to activate the heater, and wherein the controller determines whether or not the amount of ink in the casing is in an ink empty state based on the second electrical signal outputted from the pyroelectric portion via the first electrical interface when the controller activates the heater.

14. The recording apparatus as claimed in claim 13, wherein the ink cartridge further comprises an ink supply portion configured to allow the ink to flow out of the casing, and wherein the casing has a side wall located at a leading side in a direction that the ink cartridge is mounted in the cartridge accommodating section, the ink supply portion being disposed at the side wall and adjacent to the bottom wall, when an amount of ink remaining in the casing is reduced to a level such that the ink is no longer flowed out of the casing through the ink supply portion, the heat applied with the heat conductor by the heater being conducted to the pyroelectric portion at the maximum.

15. The recording apparatus as claimed in claim 13, wherein the ink cartridge further comprises a heat receiving area disposed in the heat conductor so as to be in confrontation with the heater provided at the cartridge accommodating section, the heat receiving area being configured to receive the heat applied with the heat conductor by the heater.

16. The recording apparatus as claimed in claim 9, wherein the bottom wall has a first surface outside the casing and a second surface inside the casing, the pyroelectric portion being disposed at the first surface of the bottom wall.

17. The recording apparatus as claimed in claim 9, wherein the casing has a side wall located at a leading side in a direction that the ink cartridge is mounted in the cartridge accommodating section, the side wall having a first surface outside the casing and a second surface inside the casing, the pyroelectric portion being disposed at the first surface of the side wall.

18. The recording apparatus as claimed in claim 9, wherein the ink cartridge further comprises an ink supply portion configured to allow the ink to flow out of the casing, the casing having a side wall located at a leading side in a direction that the ink cartridge is mounted in the cartridge accommodating section, the ink supply portion being disposed at the side wall and adjacent to the bottom wall, the heat conductor being disposed adjacent to the ink supply portion.

* * * * *